(12) United States Patent
Kanehiro et al.

(10) Patent No.: US 10,444,560 B2
(45) Date of Patent: Oct. 15, 2019

(54) METHOD OF PRODUCING DISPLAY PANEL

(71) Applicants: Sharp Kabushiki Kaisha, Sakai, Osaka (JP); TECNISCO, LTD., Shinagawa-ku, Tokyo (JP)

(72) Inventors: Masayuki Kanehiro, Sakai (JP); Youhei Nakanishi, Sakai (JP); Takuya Amada, Shinagawa-ku (JP); Koji Hashimoto, Shinagawa-ku (JP); Hokichi Yoshioka, Shinagawa-ku (JP)

(73) Assignees: SHARP KABUSHIKI KAISHA, Sakai (JP); TECNISCO, LTD., Tokyo (JP)

( * ) Notice: Subject to any disclaimer, the term of this patent is extended or adjusted under 35 U.S.C. 154(b) by 0 days.

(21) Appl. No.: 15/756,600

(22) PCT Filed: Sep. 2, 2016

(86) PCT No.: PCT/JP2016/075889
§ 371 (c)(1),
(2) Date: Mar. 1, 2018

(87) PCT Pub. No.: WO2017/038999
PCT Pub. Date: Mar. 9, 2017

(65) Prior Publication Data
US 2018/0188594 A1    Jul. 5, 2018

(30) Foreign Application Priority Data
Sep. 4, 2015 (JP) .................. 2015-174615

(51) Int. Cl.
*G02F 1/1335* (2006.01)
*G02F 1/1333* (2006.01)
(Continued)

(52) U.S. Cl.
CPC ...... *G02F 1/133514* (2013.01); *G02F 1/1337* (2013.01); *G02F 1/1339* (2013.01);
(Continued)

(58) Field of Classification Search
CPC . H01L 2221/68327; H01L 2221/68331; H01L 2224/94; G02F 2001/133302;
(Continued)

(56) References Cited

U.S. PATENT DOCUMENTS

| | | | | |
|---|---|---|---|---|
| 6,066,018 A | * | 5/2000 | Grupp | G02F 1/133351 349/190 |
| 2011/0297645 A1 | * | 12/2011 | Miyata | B32B 37/1018 216/23 |
| 2014/0117860 A1 | * | 5/2014 | Kim | H01L 27/3276 315/169.1 |

FOREIGN PATENT DOCUMENTS

| | | |
|---|---|---|
| JP | 62-96351 A | 5/1987 |
| JP | 2002-258253 A | 9/2002 |

(Continued)

OTHER PUBLICATIONS

Official Communication issued in International Patent Application No. PCT/JP2016/075889, dated Nov. 29, 2016.

*Primary Examiner* — Michael H Caley
*Assistant Examiner* — Mariam Qureshi
(74) *Attorney, Agent, or Firm* — Keating & Bennett, LLP

(57) ABSTRACT

A method of producing display panels of collectively producing a plurality of display panels each including a contour line of an outer shape, at least a section of which is curved includes a bonding process of forming a bonded substrate by bonding a pair of substrates including a plurality of thin film patterns formed on at least one substrate, a stacking process of stacking a plurality of bonded substrates and pinching and holding the plurality of stacked bonded substrates in a stacking direction using a jig, and a grinding process of collectively forming end surfaces of the plurality of display panels forming the curved contour line by collectively grinding the pair of substrates located outside the thin film pattern among stacked bonded substrates along the outer (Continued)

shape in a state in which the plurality of stacked bonded substrate are pinched by the jig.

11 Claims, 20 Drawing Sheets

(51) Int. Cl.
G02F 1/1339 (2006.01)
G02F 1/1337 (2006.01)
G02F 1/1343 (2006.01)
G02F 1/1362 (2006.01)
G02F 1/1347 (2006.01)

(52) U.S. Cl.
CPC ...... *G02F 1/13336* (2013.01); *G02F 1/13471* (2013.01); *G02F 1/133351* (2013.01); *G02F 1/134309* (2013.01); *G02F 1/136286* (2013.01); *G02F 2201/123* (2013.01); *G02F 2201/56* (2013.01)

(58) Field of Classification Search
CPC ....... G02F 2001/133354; G02F 1/1341; G02F 2201/56; G02F 1/133351
See application file for complete search history.

(56) References Cited

FOREIGN PATENT DOCUMENTS

JP 2006-293045 A 10/2006
JP 2007-233128 A 9/2007

\* cited by examiner

FIG.17
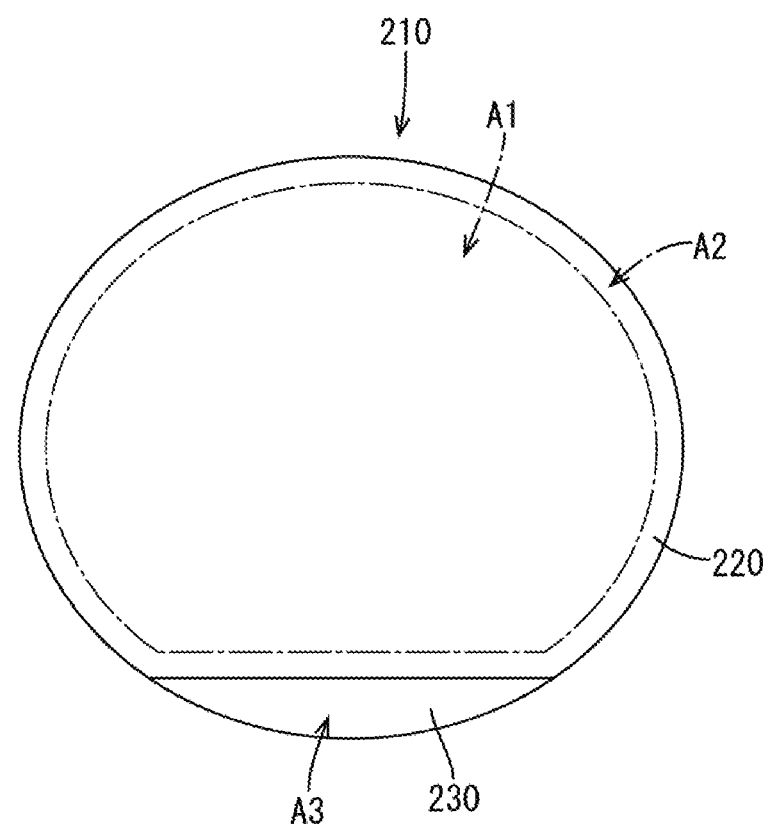
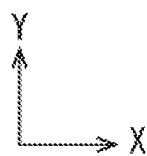

METHOD OF PRODUCING DISPLAY PANEL

TECHNICAL FIELD

The technique disclosed in this description relates to a method of producing display panels.

BACKGROUND ART

A method of producing a display panel such as a liquid crystal panel constituting a display device has been known. The method includes bonding of a pair of substrates to form a bonded board and cutting of the bonded board along an outline of the display panel. On at least one of the substrates, thin film patterns constituting semiconductor components such as thin film transistors (TFTs) are formed.

In general, the display panel produced by such a method described above generally has a quadrilateral outer shape such as a square shape and a rectangular shape in a planar view. In recent years, display panels having non-rectangular outer shapes have been produced along with the diversification in application. An example of such display panels may have a contour line of an outer shape, at least a section of which is curved. For example, a method of producing a liquid crystal panel having a substantially elliptical display area and having a non-rectangular outer shape is disclosed in Patent Document 1 below.

RELATED ART DOCUMENT

Patent Document

Patent Document 1: Japanese Patent Application Laid-Open No. 2006-293045

Problem to be Solved by the Invention

However, in the method of producing a liquid crystal panel disclosed in Patent Document 1, a base material substrate including a plurality of panel areas of a liquid crystal panel is immersed in a liquid crystal tank, and a liquid crystal is injected into each panel area. Thereafter, the base material substrate is diced into a plurality of panels in units of panel areas, and an end surface forming the outer shape of the liquid crystal panel is processed one by one for each diced panel area, and a plurality of liquid crystal panels having a non-rectangular outer shape are manufactured. For this reason, if a large number of panel areas are included in the base material substrate, it takes time to complete processing of the end surfaces of all the panel areas, and a process of producing liquid crystal panels becomes longer.

Further, in the method of producing a liquid crystal panel disclosed in the above Patent Document 1, the end surface forming the outer shape of the liquid crystal panel is processed by scribing for each panel area. For this reason, for example, in a case in which the outer shape of the liquid crystal panel to be manufactured has a curved portion, if the end surface having a complicated outer shape is processed, a crack or the like is likely to occur in the end surface to be processed due to stress accompanying scribing, and it is difficult to manufacture a liquid crystal panel having a complicated outer shape with satisfactory shape accuracy.

SUMMARY OF THE PRESENT INVENTION

The technology disclosed in this description was made in light of the above problem, and with respect to a display panel having a liquid crystal layer, it is an object of the technology to manufacture a plurality of display panels in which an outer shape has a curved portion collectively with satisfactory shape accuracy while reducing the production process.

Means for Solving the Problem

The technology disclosed in this description relates to a method of collectively producing display panels each including a contour line of an outer shape, at least a section of which is curved, including: a bonding process of forming a bonded substrate by bonding a pair of substrates including a plurality of thin film patterns formed on at least one substrate, a stacking process of stacking a plurality of bonded substrates after the bonding process and pinching and holding the plurality of stacked bonded substrates in a stacking direction using a jig, and a grinding process of collectively forming end surfaces of the display panels forming the curved contour line by collectively grinding the pair of substrates located outside the thin film pattern among the plurality of stacked bonded substrates in a state in which the plurality of stacked bonded substrate are pinched by the jig along the outer shape after the stacking process.

In the method of producing display panels, in the stacking process, the stacked bonded substrates are pinched using the jig in the stacking direction, and thus it is possible to easily hold each of the plurality of bonded substrates in the stacked state. Thereafter, in the grinding process, a pair of substrates located outside the thin film pattern among a plurality of stacked bonded substrates can be ground collectively e along the outer shape of the display panel to be manufactured, and the end surfaces of the plurality of display panels forming the curved contour line can be collectively formed. Therefore, the display panel producing process can be reduced as compared with a case in which the bonded substrate is processed one by one to form the end surface of the display panel or a case in which each of the stacked bonded substrates is held using curable resin or the like.

Further, since the bonded substrates are held in the stacked state, stiffness becomes larger than that of one bonded substrate, and thus when a plurality of stacked bonded substrates are collectively ground, the occurrence of a crack or the like on the end surface of the display panel to be manufactured can be suppressed. Further, since the end surface of the display panel forming the curved contour line is formed by grinding the stacked bonded substrates collectively, the contour line forming the outer shape of each display panel to be manufactured can be formed with satisfactory shape accuracy. As described above, in the production method described above, it is possible to manufacture a plurality of display panels in which the outer shape has the curved portion with satisfactory shape accuracy while reducing the production process.

In the above method of producing display panels, in the stacking process, a buffer member may be interposed between two of the plurality of bonded substrates.

According to the production method, the buffer member is interposed between the bonded substrates stacked in the stacking process, and thus it is possible to suppress mutual interference of the stacked bonded substrates and damages by the buffer member.

In the method of producing display panels, a buffer member having a water swelling property may be used in the stacking process.

According to the production method, the buffer member absorbs moisture and expands, and thus it is possible to easily peel the buffer member when the buffer member is peeled off from between the bonded substrates after the grinding process.

In the method of producing display panels, in the stacking process, a pair of dummy substrates having a plate surface larger than the bonded substrate may be prepared, and the plurality of stacked bonded substrates may be pinched by the jigs with the dummy substrate interposed therebetween.

According to the production method, in a state in which the plurality of stacked bonded substrates are held by the jig, the rotating grinding stone or the like used for grinding comes into contact with the pair of dummy substrates pinching the plurality of bonded substrates. Therefore, in the grinding process, it is possible to suppress concentration of the stress accompanying the grinding on the bonded substrate positioned at the uppermost side and the bonded substrate positioned at the lowermost side among the plurality of stacked bonded substrates, and it is possible to suppress chipping or the like in both the bonded substrates.

In the above method of producing display panels, the jig may include a first plate-like member having the curved contour line, a second plate-like member, and a connecting member connecting the first plate-like member with the second plate-like member, and in the stacking process, in a state in which the connecting member is positioned outside the plurality of stacked bonded substrates, the first plate-like member may be caused to overlap portions excluding portions to be ground in the grinding process in the plurality of stacked bonded substrates at a planar view, and the plurality of bonded substrates may be pinched between the first plate-like member and the second plate-like member.

According to the production method, in the stacking process, the first plate-like member of the jig positioned on one side of the plurality of stacked bonded substrates in the stacking direction is caused to overlap the portion excluding the portion to be ground in the grinding process in the bonded substrates at a planar view, and thus it is possible to prevent the rotating grinding stone or the like used for the grinding from coming into contact with the first plate-like member in the grinding process. As described above, it is possible to provide a specific configuration of the jig used in the grinding process.

In the above method of producing display panels, a groove along the curved contour line may be formed in one plate surface of the second plate-like member of the jig, and in the stacking process, the plurality of bonded substrates may be pinched between the first plate-like member and the second plate-like member such that the one plate surface of the second plate-like member faces inward.

According to the production method, in the grinding process, the rotating grinding stone or the like used for grinding is inserted into the groove on the other side of the plurality of stacked bonded substrates in the stacking direction, and thus it is possible to prevent the jig from interfering with the second plate-like member, and the load on the jig is reduced, and thus it is possible to satisfactorily grind up to the end portion on the other side of the plurality of stacked bonded substrates in the stacking direction.

In the above method of producing display panels, the first plate-like member of the jig may have a circular shape, and in the grinding process, after parts of the plurality of stacked bonded substrates are ground, a position of the jig may be changed, and the plurality of stacked bonded substrates may be ground again.

According to the production method, it is possible to manufacture a display panel having a circular outer shape. In other words, after the semicircular contour line which is half of the outer shape of the display panel to be manufactured is formed by grinding parts of the plurality of stacked bonded substrate, the position of the jig is changed, the position of the connecting member is changed, and then the plurality of stacked bonded substrate can be ground again, and thus the circular display panel can be manufactured by further forming the semicircular contour line which is the remaining half of the outer shape of the display panel to be manufactured.

In the above method of producing display panels, the first plate-like member of the jig may have a circular shape, and in the grinding process, after parts of the plurality of stacked bonded substrates are ground, the first plate-like member may be connected with the second plate-like member through a member different from the connecting member while holding the plurality of stacked bonded substrates with the jig, and after the connecting member is detached, the plurality of stacked bonded substrates may be ground again.

According to the production method, it is possible to manufacture a display panel having a circular outer shape. Further, since the grinding process can be performed while maintaining the state in which the plurality of bonded substrates are held by the jig, it is possible to simplify and reduce the grinding process as compared with a case in which the jig is temporarily detached from the plurality of stacked substrates, and the position of the jig is changed in the grinding process.

In the method of producing display panels, the display panel may have a configuration in which a liquid crystal layer is formed on an inner surface side of the bonded substrate, the pair of substrates may be bonded with a sealant interposed therebetween in a state in which a plurality of sealants are applied on one of the pair of substrates in a form of surrounding each of the thin film patterns, and liquid crystals serving as the liquid crystal layer are dropped in the bonding process, the method of producing display panels may further includes a strip-like dicing process of dicing the bonded substrate into a plurality of strips in which the plurality of thin film patterns are arranged linearly by dividing the bonded substrate after the bonding process, and in the stacking process, the plurality of bonded substrates diced in a form of the strip are pinched by the jig for each area including a single thin film pattern.

According to the production method, in the bonding process, it is possible to form the liquid crystal layer between a pair of substrates by applying the sealant on one of the pair of substrates in a form of surrounding each thin film pattern and attaching the pair of substrates with the sealant interposed therebetween in a state in which the liquid crystals serving as the liquid crystal layer are dropped. In the strip-like dicing process, it is possible to collectively form the end surfaces of a plurality of display panels having the curved contour line by collectively grinding a pair of substrates positioned outside the thin film patterns among a plurality of diced bonded substrates along the outer shape of the display panel to be manufactured in the grinding process after the bonded substrate is diced into a plurality of strips in which a plurality of thin film patterns are arranged linearly. Since the liquid crystal layer is formed by a one drop fill (ODF) technique in the bonding process as described above, the production process of the display panel including the liquid crystal layer is reduced as compared with a case in which a vacuum injection technique is used.

In the method of producing display panels, the display panel may have a configuration in which a liquid crystal layer is formed on an inner surface side of the bonding substrate, and in the bonding process, a plurality of sealants may be applied on the one substrate in a form in which each of the thin film patterns is surrounded, and parts of the sealants are divided, and the pair of substrates may be bonded with the sealant interposed therebetween, the method of producing display panels may further includes a strip-like dicing process of dicing the bonded substrate into a plurality of strips in which the plurality of thin film patterns are arranged linearly by dividing the bonded substrate after the bonding process, a liquid crystal injecting process of collectively injecting liquid crystals constituting the liquid crystal layer from an injection port into the inside of the sealant using the divided portions of the sealants surrounding the plurality of thin film patterns arranged linearly as the injection port, and a sealing process of sealing the injection port of each of the sealants with sealing resin before the stacking process after the liquid crystal injecting process, and in the stacking process, the plurality of bonded substrates diced in a form of the strip may be pinched by the jig for each area including a single thin film pattern.

According to the production method, in the bonding process, a pair of substrates are bonded together with the sealant interposed therebetween which is applied in a form in which a part of the sealant is divided, and in the strip-like dicing process, the bonded substrate is diced into a plurality of strips in which a plurality of thin film patterns are linearly arranged, and in the liquid crystal injecting process, the liquid crystals can be collectively injected into the inside of each sealant surrounding each thin film pattern. In the subsequent grinding process, end surfaces of a plurality of display panels forming a curved contour line can be collectively formed by collectively grinding a pair of substrates located outside the thin film patterns among a plurality of diced bonded substrates along the outer shape of the display panel to be manufactured. Therefore, the production process of the display panel having the liquid crystal layer can be reduced as compared with a case in which, for a plurality of sealants applied on the bonded substrate, the liquid crystals are injected inside the sealant for each sealant, and the bonded substrate is processed one by one for each panel area to form the end surface of the display panel.

Advantageous Effect of the Invention

According to the technique disclosed in this description, it is possible to collectively manufacture a plurality of display panels in which the outer shape has a curved portion with satisfactory shape accuracy while reducing the production process.

BRIEF DESCRIPTION OF THE DRAWINGS

FIG. 17 is a schematic plane view of a liquid crystal panel according to a third embodiment.

MODE FOR CARRYING OUT THE INVENTION

First Embodiment

Figure 1:
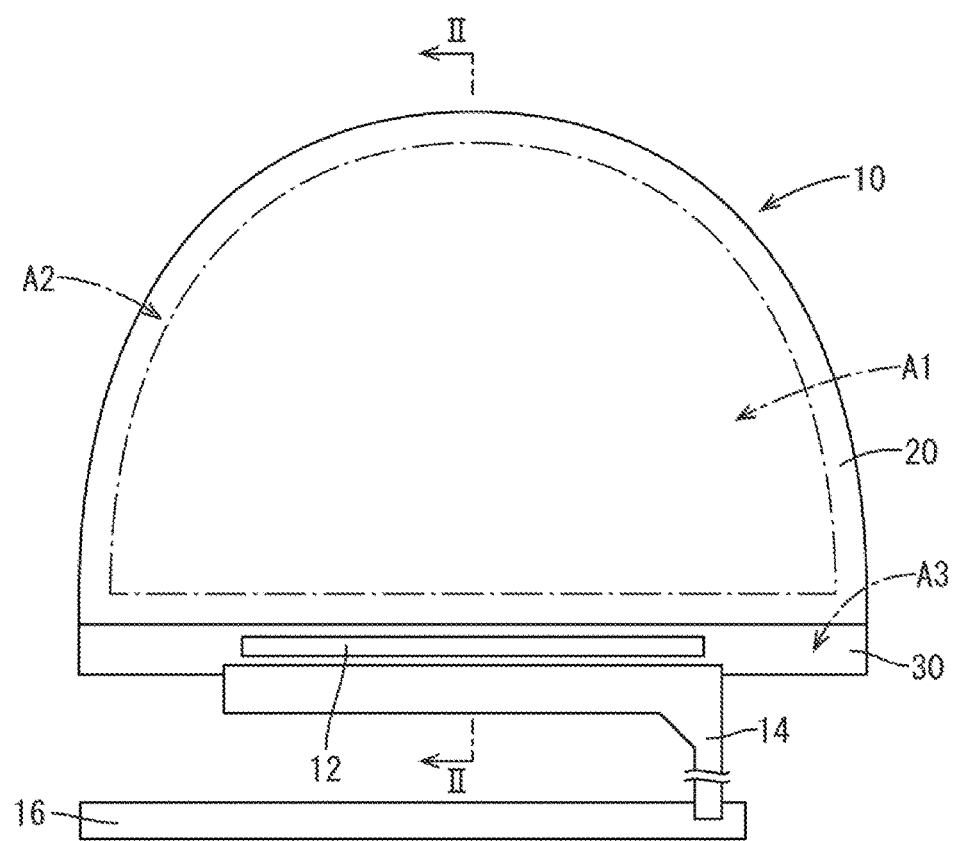
FIG. 1 is a schematic plane view of a liquid crystal panel according to a first embodiment.

A first embodiment will be described with reference to FIGS. 1 to 10. In the present embodiment, a method of producing a liquid crystal panel (an example of a display panel) 10 constituting a liquid crystal display device will be described. In some of the drawings, an X axis, a Y axis, and a Z axis are illustrated, and each axis direction is drawn to be the same direction in each drawing. Further, in a cross-sectional view illustrated in FIG. 2 and respective perspective views, an upper side of the drawing is assumed to be an upper side (front side) of the liquid crystal panel 10.

First, a configuration of the liquid crystal panel 10 will be described. In the liquid crystal panel 10 described in the present embodiment, the outer shape at a planar view is neither a general rectangular shape nor a square shape, but apart of a contour line forming the outer shape is curved, and the entire shape is a non-rectangular shape. Specifically, as illustrated in FIG. 1, the liquid crystal panel 10 has a substantially semicircular outer shape at a planar view. In FIG. 1, a direction in which a linear portion of the contour line forming the outer shape of the liquid crystal panel 10 extends coincides with the X-axis direction.

In the liquid crystal panel 10, an oblong display area A1 in which an image can be displayed is arranged in most of the liquid crystal panel 10, and an area outside the display area A1 is regarded as a non-display area A2 in which no image is displayed. In the non-display area A2, a frame-like portion surrounding the display area A1 serves as a frame portion of the liquid crystal panel 10. Further, in the non-display area A2, a position biased to one end side of the liquid crystal panel 10 in the Y-axis direction (a lower side in FIG. 1) serves as a mounting area A3 in which an IC chip (an example of a drive part) 12 and a flexible substrate 14 are mounted. The IC chip 12 is an electronic part for driving the liquid crystal panel 10, and the flexible substrate 14 is a substrate for connecting a control substrate 16 for supplying various kinds of input signals from the outside to the IC chip 12 with the liquid crystal panel 10. The mounting area A3 is an area of an oblong rectangular shape as illustrated in FIG. 1, and the contour line constituting the outer shape has a long side extending along the X axis and a short side extending in the Y-axis direction in FIG. 1.

Figure 2:
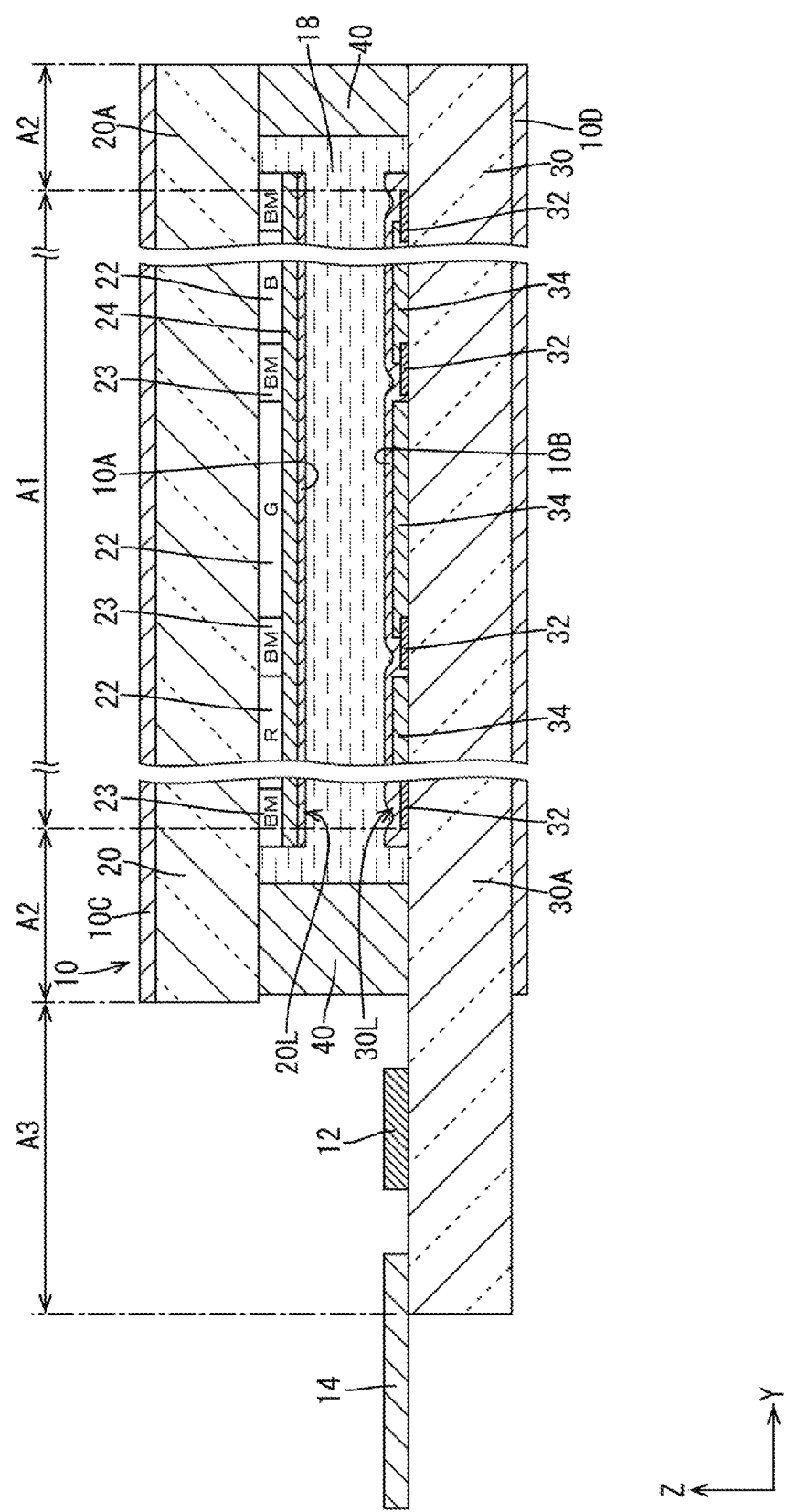
FIG. 2 illustrates a cross-sectional configuration taken along line II-II in FIG. 1 and is a schematic cross-sectional view of a liquid crystal panel.

As illustrated in FIGS. 1 and 2, the liquid crystal panel 10 includes a pair of glass substrates 20 and 30 which are excellent in translucency and a liquid crystal layer 18 containing liquid crystal molecules which are substances whose optical characteristic changes when an electric field is applied. Of both the substrates 20 and 30, the substrate 20 on a front side (a front surface side) serves as the color filter substrate 20, and the substrate 30 on a back side (a back surface side) serves as the array substrate 30. Alignment films 10A and 10B for aligning the liquid crystal molecules contained in the liquid crystal layer 18 are formed on inner surface sides of the substrates 20 and 30. Polarizing plates 10C and 10D are attached to outer surface sides of a first glass substrate (an example of a substrate) 20A and a second glass substrate (an example of a substrate) 30A constituting both the substrates 20 and 30.

In the first glass substrate 20A constituting the color filter substrate 20, the array substrate 30 and the polarizing plate 10C are bonded to a main part thereof. As illustrated in FIG. 1, in the color filter substrate 20, a dimension in the X-axis direction is substantially equal to that of the array substrate 30, but a dimension in the Y-axis direction is smaller than that of the array substrate 30, and the color filter substrate 20 is bonded to the array substrate 30 such that one ends in the Y-axis direction (the upper side illustrated in FIG. 1, that is, the side having an arcuate curved line in the contour line) are aligned with each other. Therefore, the other end portion of the array substrate 30 in the Y-axis direction (the lower side illustrated in FIG. 1) does not overlap the color filter substrate 20 in a predetermined range, both front and back plate surfaces are exposed to the outside, and the mounting area A3 of the IC chip 12 and the flexible substrate 14 is secured here.

In the second glass substrate 30A constituting the array substrate 30, the color filter substrate 20 and the polarizing plate 10D are bonded to a main part thereof, and a portion in which the mounting area A3 of the IC chip 12 and the flexible substrate 14 is secured does not overlap the color filter substrate 20 and the polarizing plate 10D. A sealant 40 for bonding both the substrates 20 and 30 constituting the liquid crystal panel 10 is disposed in the non-display area A2 in a shape along the outer shape of the color filter substrate 20 (in a substantially semicircular shape at a planar view) to surround the display area A1 in a portion in which both the substrates 20 and 30 overlap each other (see FIG. 2).

A plurality of stacked thin film patterns are formed on the inner surface side (the liquid crystal layer 18 side) of the second glass substrate 30A constituting the array substrate 30. Specifically, on the inner surface side of the second glass substrate 30A constituting the array substrate 30, a plurality of thin film patterns of TFTs 32 serving as a switching element and a plurality of thin film patterns of pixel electrodes 34 each formed of a transparent conductive film such as an indium tin oxide (ITO) and connected to the TFT 32 are formed in a matrix form at a planar view. A gate line, a source line, and a capacitive line (not illustrated) are arranged around the TFT 32 and the pixel electrode 34 in the array substrate 30. Terminal portions led from the gate line and the capacitive line and a terminal portion led from the source line are disposed at the end portion of the array substrate 30. Each signal or a reference potential is inputted from the control substrate 16 illustrated in FIG. 1 to each of the terminal portions, and driving of the TFT 32 is controlled in accordance with each signal or the reference potential.

On the other hand, as illustrated in FIG. 2, a plurality of color filters 22 arranged in a matrix form to overlap the pixel electrodes 34 of the array substrate 30 at a planar view are formed side by side on the inner surface side (the liquid crystal layer 18 side) of the first glass substrate 20A constituting the color filter substrate 20 as illustrated in FIG. 2. The color filter 22 includes color sections of R (red), G (green), B (blue), and the like. A grating-like light blocking portion (black matrix) 23 for preventing color mixing is formed between the color sections constituting the color filter 22. The light blocking portion 23 is arranged to overlap with the gate line, the source line, and the capacitive line formed on the array substrate 30 at a planar view. In the liquid crystal panel 10, one display pixel serving as a display unit is constituted by color sections of three colors of R (red), G (green), and B (blue) and a set of three pixel electrodes 34 facing the color sections. The display pixel includes a red pixel with the color section of R, a green pixel with the color section of G, and a blue pixel with the color section of B. The pixels of the respective colors are repeatedly arranged side by side on the plate surface of the liquid crystal panel 10 in the row direction (X-axis direction) to form a pixel group, and a plurality of pixel groups are arranged side by side in a column direction (the Y-axis direction).

A counter electrode 24 opposed to the pixel electrode 34 on the array substrate 30 side is formed on the inner surface side of the color filter 22 and the light blocking portion 23 as illustrated in FIG. 2. In the non-display area A2 of the liquid crystal panel 10, a counter electrode wiring (not illustrated) is arranged, and the counter electrode wiring is connected to the counter electrode 24 via a contact hole (not illustrated). A reference potential is applied to the counter electrode 24 from the counter electrode wiring, and it is possible to cause a predetermined potential difference to occur between the pixel electrode 34 and the counter electrode 24 by controlling the potential applied to the pixel electrode 34 through the TFT 32.

The configuration of the liquid crystal panel 10 according to the present embodiment has been described above. Hereinafter, an end surface in which the contour line forming the outer shape is linear in the end face of the liquid crystal panel 10 (a left end surface in FIG. 2) is referred to as a "linear end surface" and an end surface in which the contour line forming the outer shape is curved (a right end surface in FIG. 2) is referred to as a "curved end surface." Hereinafter, in the above-described structures formed on the first glass substrate 20A, the portions excluding the alignment film 10A are collectively referred to as a CF layer (an example of a thin film pattern) 20L, and in the above-described structures formed on the second glass substrate 30A, the portions excluding the alignment film 10B are collectively referred to as a TFT layer (an example of a thin film pattern) 30L.

Next, a method for collectively producing a plurality of liquid crystal panels 10 having the above-described structure will be described. First, a first glass substrate 20A constituting the color filter substrate 20 and a second glass substrate 30A constituting the array substrate 30 are prepared. Then, the CF layer 20L is formed on one plate surface of the first glass substrate 20A, and the TFT layer 30L is formed on one plate surface of the second glass substrate 30A. A known photolithography technique is used to form-ing the CF layer 20L and the TFT layer 30L on the first glass substrate 20A and the second glass substrate 30A. In other words, while causing the first glass substrate 20A and the second glass substrate 30A to be conveyed between respective devices such as a film forming apparatus, a resist applying apparatus, and an exposure apparatus used in the photolithography technique, thin films constituting the CF layer 20L and the TFT layer 30L are sequentially stacked on the first glass substrate 20A and the second glass substrate 30A in a predetermined pattern.

In the production method of the present embodiment, a bonded substrate 50 in which the first glass substrate 20A and the second glass substrate 30A are bonded together is used as a base material substrate, and the bonded substrate 50 is divided and diced into individual pieces in a process described later, and thus 24 liquid crystal panels 10 are manufactured from the bonded substrate 50. In other words, the CF layers 20L are formed at 24 positions on the first glass substrate 20A, and the TFT layers 30L are formed at 24 positions on the second glass substrate 30A (see FIG. 3). The CF layers 20L and the TFT layers 30L are formed on both the glass substrates 20A and 30A in a matrix form (in the present embodiment, four lines in the X-axis direction and six lines in the Y-axis direction) with an arrangement in which each of the CF layers 20L and each of the TFT layers 30L face each other when the two glass substrates 20A and 30A are bonded to each other.

Figure 3:
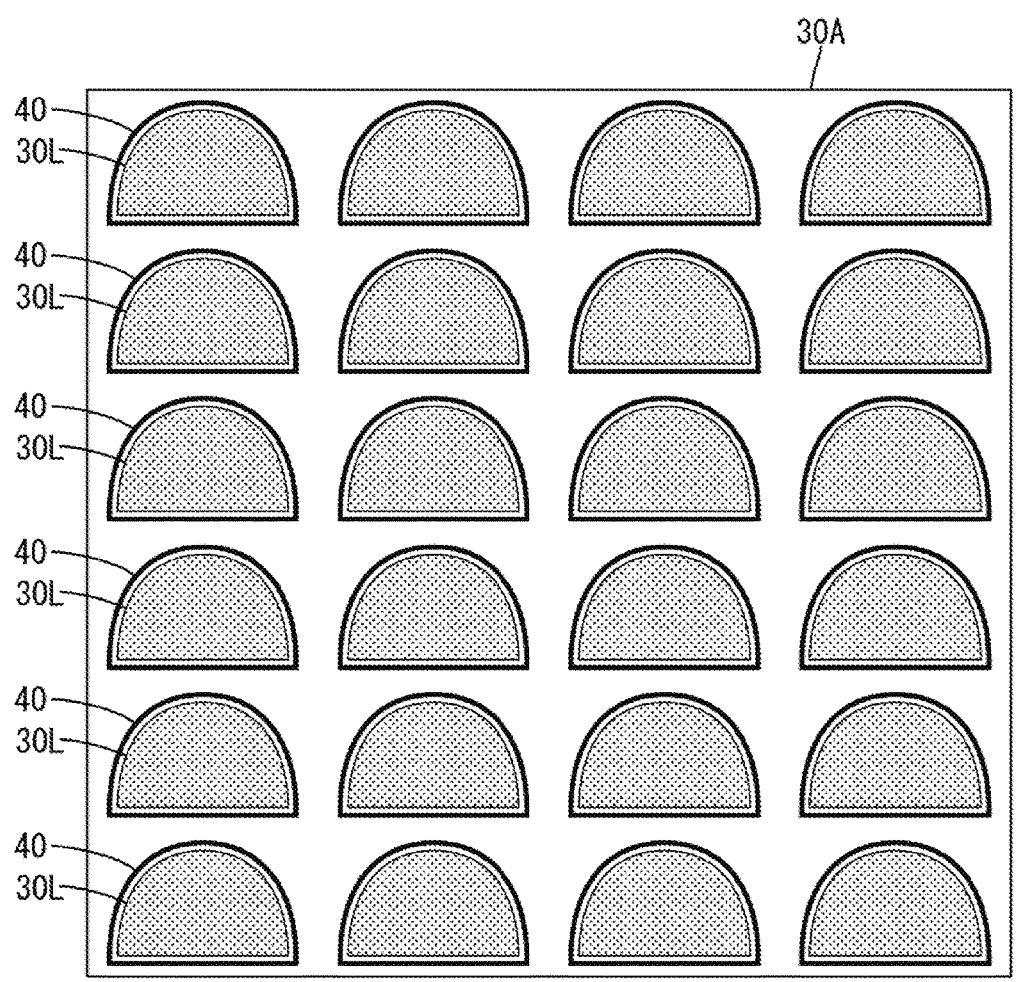
FIG. 3 is a plane view illustrating an array substrate before an array substrate and a color filter substrate are bonded in a bonding process.

Next, the alignment film 10A is formed on the first glass substrate 20A to cover the respective CF layers 20L formed on the first glass substrate 20A, and the alignment film 10B is formed on the second glass substrate 30A to cover the respective TFT layers 30L formed on the second glass substrate 30A. With the above procedure, the color filter substrate 20 is completed at 24 positions on the first glass substrate 20A, and the array substrate 30 is completed at 24 positions on the second glass substrate 30A. Then, the sealant 40 is applied on the second glass substrate 30A to surround each TFT layer 30L on the second glass substrate 30A as illustrated in FIG. 3. In this process, the sealant 40 is applied with a predetermined width along the outer shape of each liquid crystal panel 10 to be manufactured (substantially semicircular shape in the present embodiment).

Figure 4:
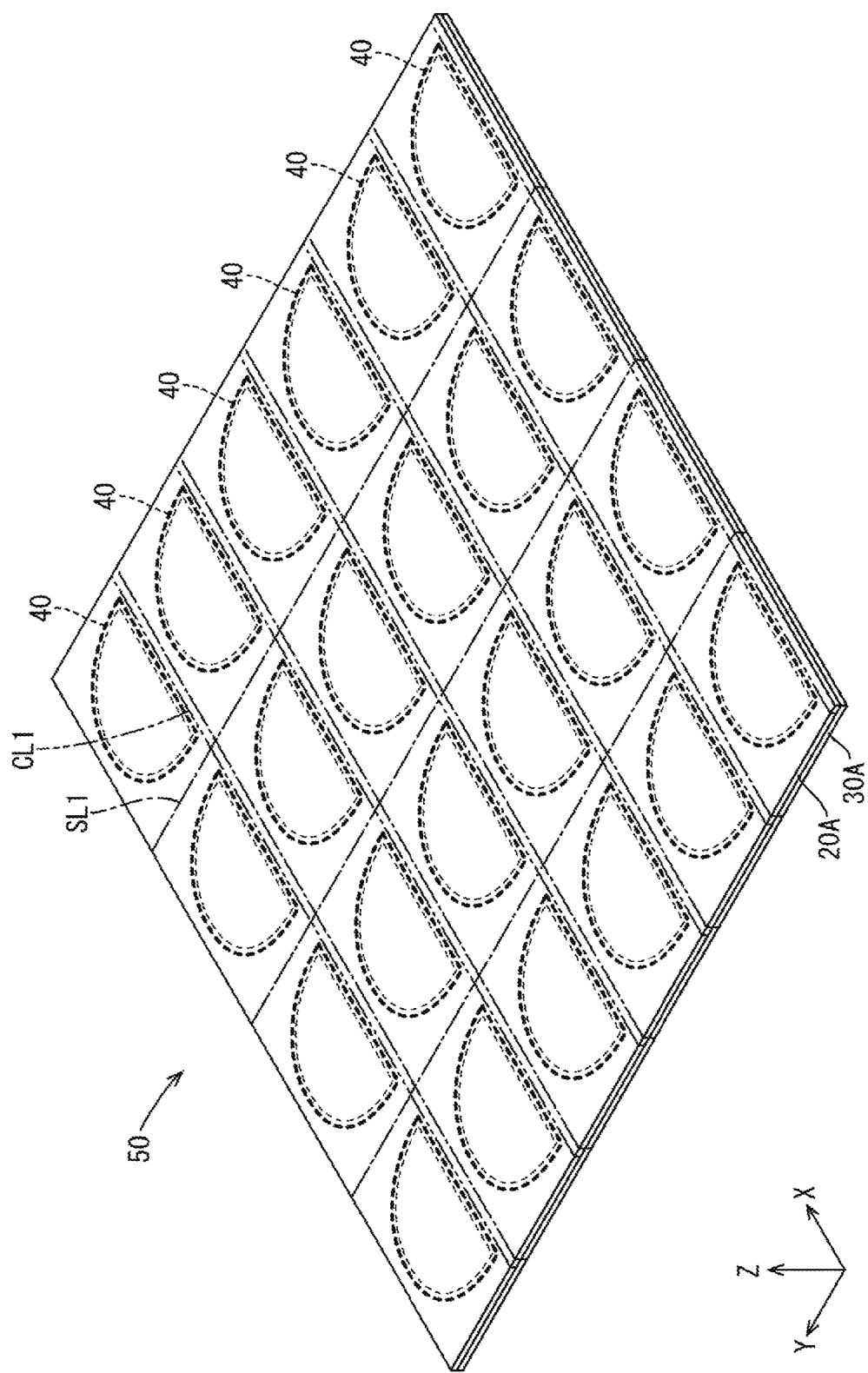
FIG. 4 is a perspective view illustrating a bonded substrate before divided.

Then, alignment is performed to obtain a position relation in which each CF layer 20L formed on the first glass substrate 20A and each TFT layer 30L formed on the second glass substrate 30A face each other, and liquid crystals are dropped into each area surrounded by the sealant 40 on the second glass substrate 30A using an one drop fill (ODF) technique using a liquid crystal dropping apparatus. Thereafter, the glass substrates 20A and 30A are bonded together via the sealant 40 to form the bonded substrate 50 serving as the base material substrate as illustrated in FIG. 4 (a bonding process). The bonding process is performed while irradiating the sealant 40 with ultraviolet rays and applying heat. Accordingly, the sealant 40 is cured, and the glass substrates 20A and 30A are fixed via the sealant 40.

Since the two glass substrates 20A and 30A are bonded to each other in the bonding process, the liquid crystals dropped before both the glass substrates 20A and 30A are bonded are spread in a direction of the plate surface of the second glass substrate 30A, and the area surrounded by the sealant 40 is filled with the liquid crystals, whereby the liquid crystal layer 18 is formed between both the glass substrates 20A and 30A. In the bonded substrate 50 formed as described above, an area including a set of the CF layer 20L and the TFT layer 30L facing each other is a panel area in which one liquid crystal panel 10 is formed, and the bonded substrate 50 is partitioned into 24 panel areas as illustrated in FIG. 4. In FIG. 4, alternate long and short dash lines indicated by reference numeral SL1 are lines for partitioning each panel area on the bonded substrate 50. Each panel area includes the cured sealant 40 and the thin film patterns (portions surrounded by thin broken lines in FIG. 4) including the CF layer 20L and the TFT layer 30L formed inside the sealant 40. The bonding process is not limited to a case in which the sealant 40 is applied and the liquid crystal is dropped on the second glass substrate 30A side as described above, and the sealant 40 may be applied and the liquid crystal may be dropped on the first glass substrate 20A side.

Then, one bonded substrate 50 is divided and diced into 24 pieces for each panel area (a dicing process) (hereinafter, the divided diced bonded substrate is referred to as a "diced bonded substrate 50A"). Specifically, in the dicing process, the bonded substrate 50 is scribed with a rotary blade (not illustrated) using the lines for partitioning each panel area on the bonded substrate 50 as a scribe line SL1. Accordingly, a pair of glass substrates 20A and 30A located outside the sealant 40 of each panel area is divided. Further, in the dicing process, in each panel area, a linear cut line CL1 (a line indicated by an alternate long and two short dashes line in FIG. 4) is formed in a portion serving as a boundary between the mounting area A3 of each liquid crystal panel 10 to be manufactured and another area in the first glass substrate 20A constituting the bonded substrate 50A. Then, after the bonded substrate 50 is equally divided into 24, a part of the first glass substrate 20A is removed from each of the diced bonded substrates 50A along the cut line CL1. Accordingly, a portion serving as the mounting area A3 of the liquid crystal panel 10 to be manufactured is exposed (see FIG. 5).

Figure 5:
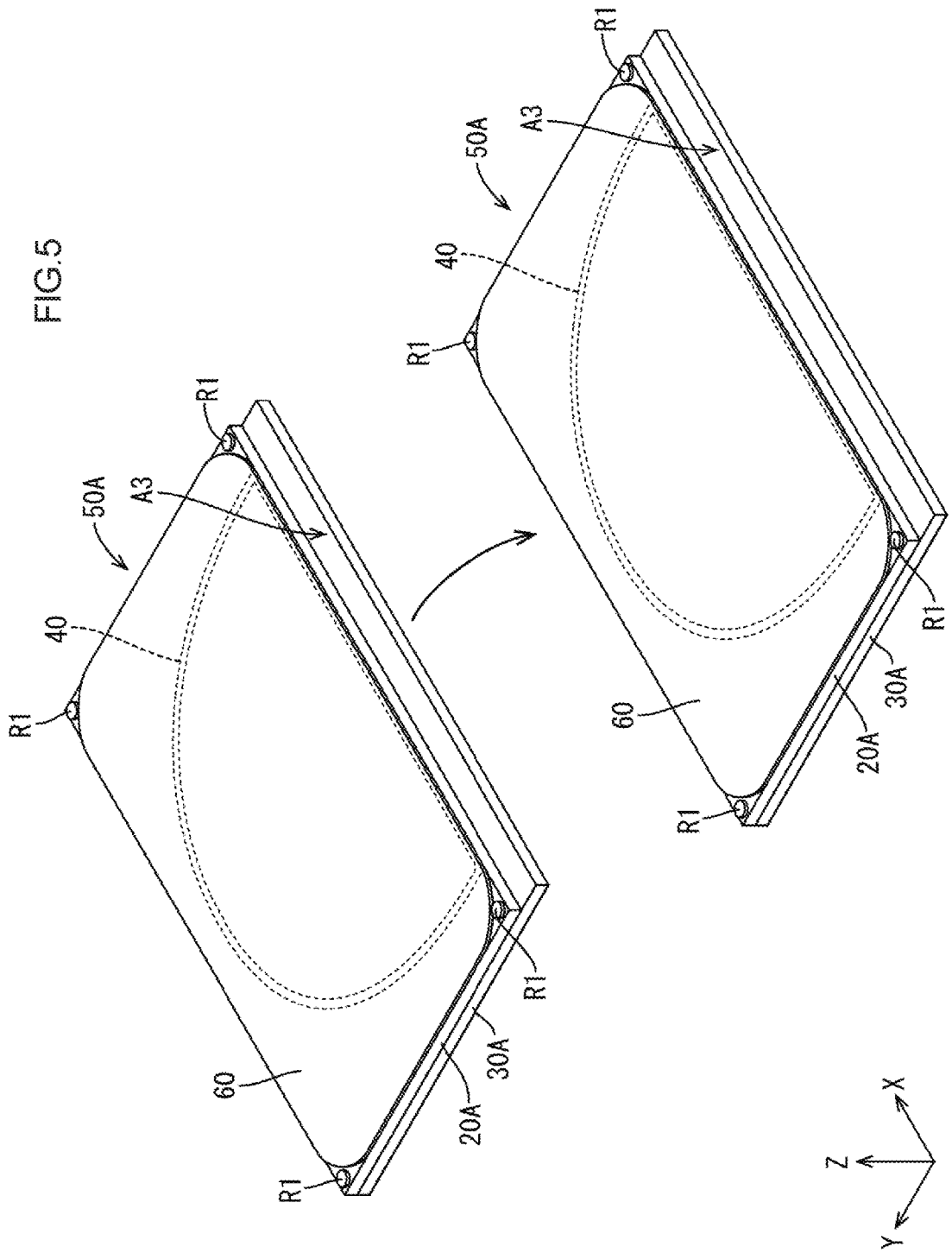
FIG. 5 is a perspective view illustrating a stacking process of stacking diced bonded substrates.

Then, a stacking process of stacking the diced bonded substrates 50A is performed as illustrated in FIG. 5. In the stacking process, three diced bonded substrates 50A are stacked with a sheet-like sheet member (an example of a buffer member) 60 having a buffering property and a water swelling property interposed therebetween while aligning the three diced bonded substrates 50A to coincide with one another at a planar view. A size of the sheet member 60 is substantially equal to a size of the plate surface of the first glass substrate 20A in the diced bonded substrate 50A in which the mounting area A3 is exposed. Japanese paper containing cellulose as a main component can be used as an example of the sheet member 60. The four corners of the sheet member 60 are rounded off, and in the state in which the sheet member 60 is disposed on the first glass substrate 20A of the diced bonded substrate 50A, the four corners of the first glass substrate 20A are exposed (see FIG. 5). In the stacking process, each diced bonded substrate 50A is stacked while dropping temporary fixing resin R1 made of photo-curable resin onto the four corners of the first glass substrate 20A exposed from the sheet member 60.

A thickness of the sheet member 60 is, for example, 10 μm to 200 μm and, preferably, 10 μm to 50 μm. As the thickness of the sheet member 60 decreases, it is possible to further suppress the deviation of each stacked diced bonded substrate 50A, chipping, and the like in the grinding process to be described later. Since each diced bonded substrate 50A is stacked with the sheet member 60 interposed between the diced bonded substrates 50A as described above, the front surface of each liquid crystal panel 10 to be manufactured can be protected. For example, acrylic resin can be used as the temporary fixing resin R1.

Figure 6:
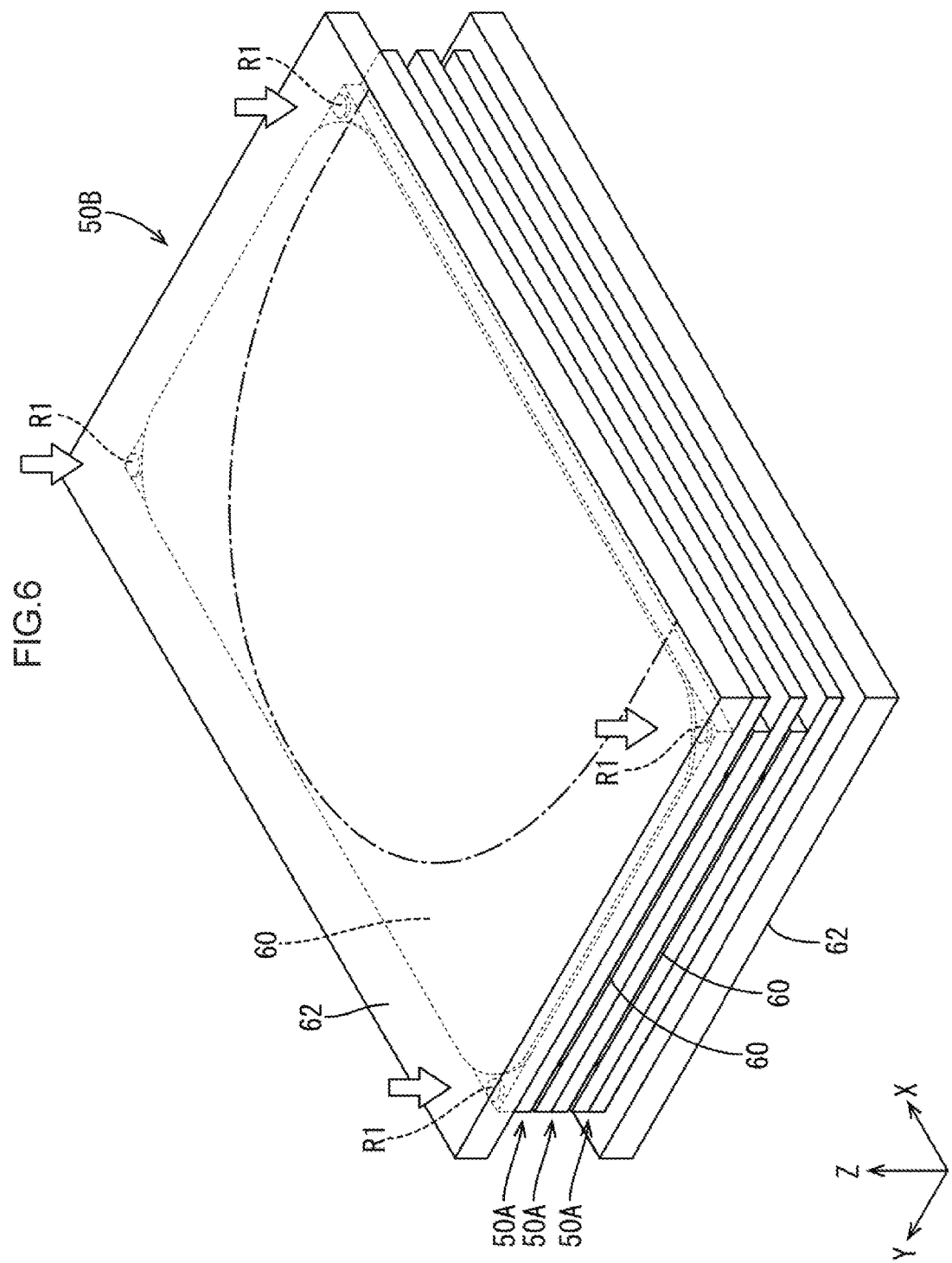
FIG. 6 is a perspective view illustrating a stacked substrate.

In the stacking process, after the three diced bonded substrates 50A are stacked, the three stacked diced bonded substrates 50A are pinched by a pair of glass dummy substrates 62 with the sheet member 60 and the temporary fixing resin R1 to as illustrated in FIG. 6. In the dummy substrate 62, a size of a plate surface is larger than that of the plate surface of the diced bonded substrate 50A, and a thickness thereof is larger than a thickness of the diced bonded substrate 50A. Further, in the stacking process, after the stacked three diced bonded substrates 50A are pinched by a pair of dummy substrates 62, positions corresponding to the four positions onto which the temporary fixing resin R1 is dropped (four positions indicated by arrows in FIG. 6) are spot-irradiated with ultraviolet light as illustrated in FIG. 6. Accordingly, the temporary fixing resin R1 is cured at the four positions, and the three diced bonded substrates 50A and a pair of dummy substrates 62 are temporarily fixed in the stacked state.

Hereinafter, the stacked three diced bonded substrates 50A and a pair of dummy substrates 62 pinching the stacked three diced bonded substrates 50A are collectively referred to as a stacked substrate 50B. Three liquid crystal panels 10 can be manufactured from this stacked substrate 50B. In the stacking process, after the temporary fixing is performed, as illustrated in FIG. 7, a clamping jig 70 is aligned with the stacked substrate 50B using an alignment mark (not illustrated), the stacked substrate 50B is pinched by the jig 70 in a stacking direction, and the diced bonded substrates 50A and a pair of dummy substrates 62 constituting the stacked substrate 50B are held in the stacked state.

Figure 7:
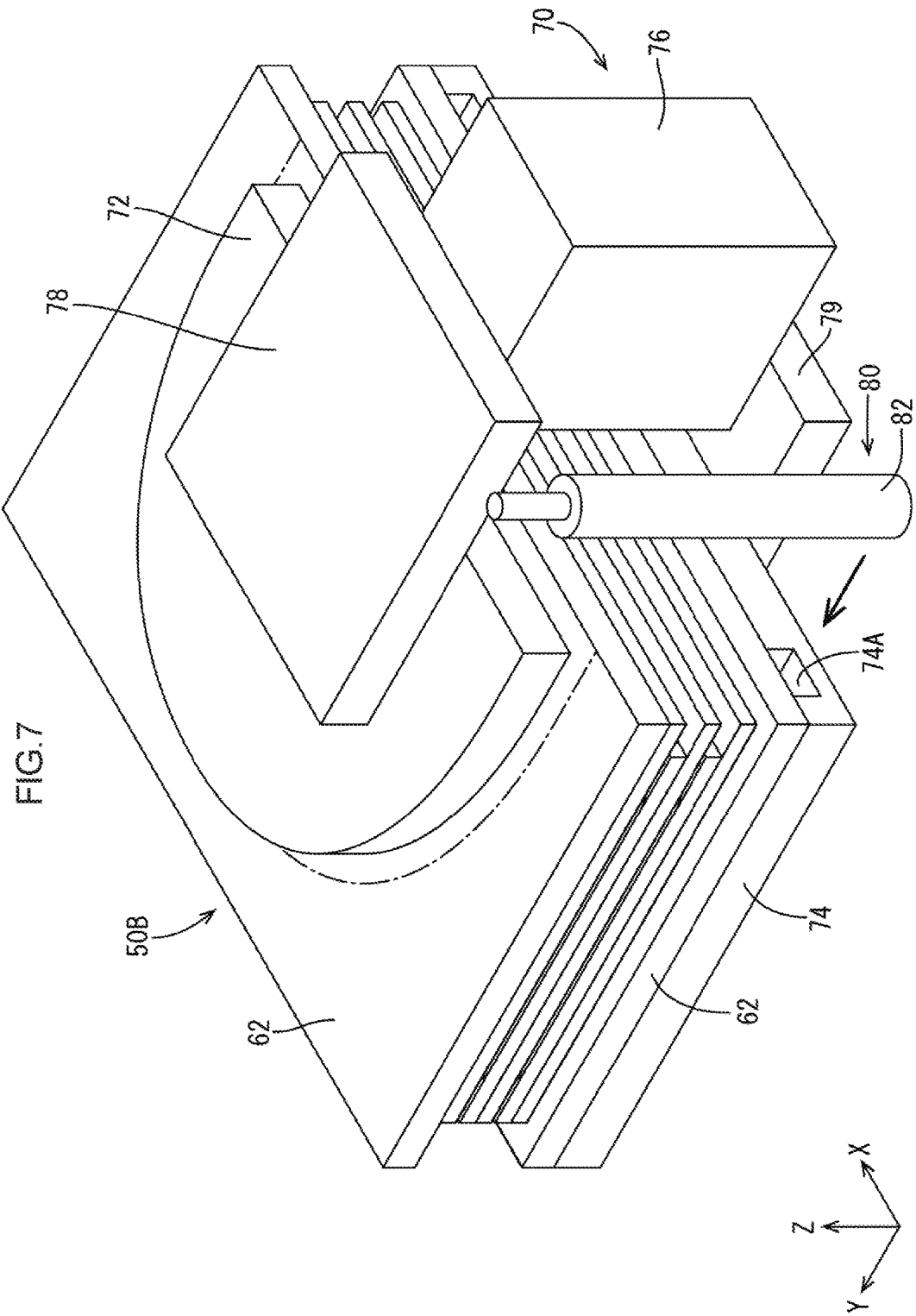
FIG. 7 is a perspective view illustrating a stacked substrate pinched in a jig.

As illustrated in FIG. 7, the jig 70 includes an upper plate (an example of a first plate-like member) 72 which pinches the stacked substrate 50B downward, a lower plate (an example of a second plate-like member) 74 which pinches the stacked substrate 50B upwards, a block-like support portion 76 which is disposed outside the stacked substrate 50B and extends in the stacking direction of the stacked substrate 50B, an upper connecting plate 78 that connects an upper surface of the upper plate 72 with an upper end portion of the support portion 76, and a lower connecting plate 79 that connects a lower surface of the lower plate 74 with a lower end portion of the support portion 76. The support portion 76, the upper connecting plate 78, and the lower connecting plate 79 are an example of a connecting member.

Figure 8:
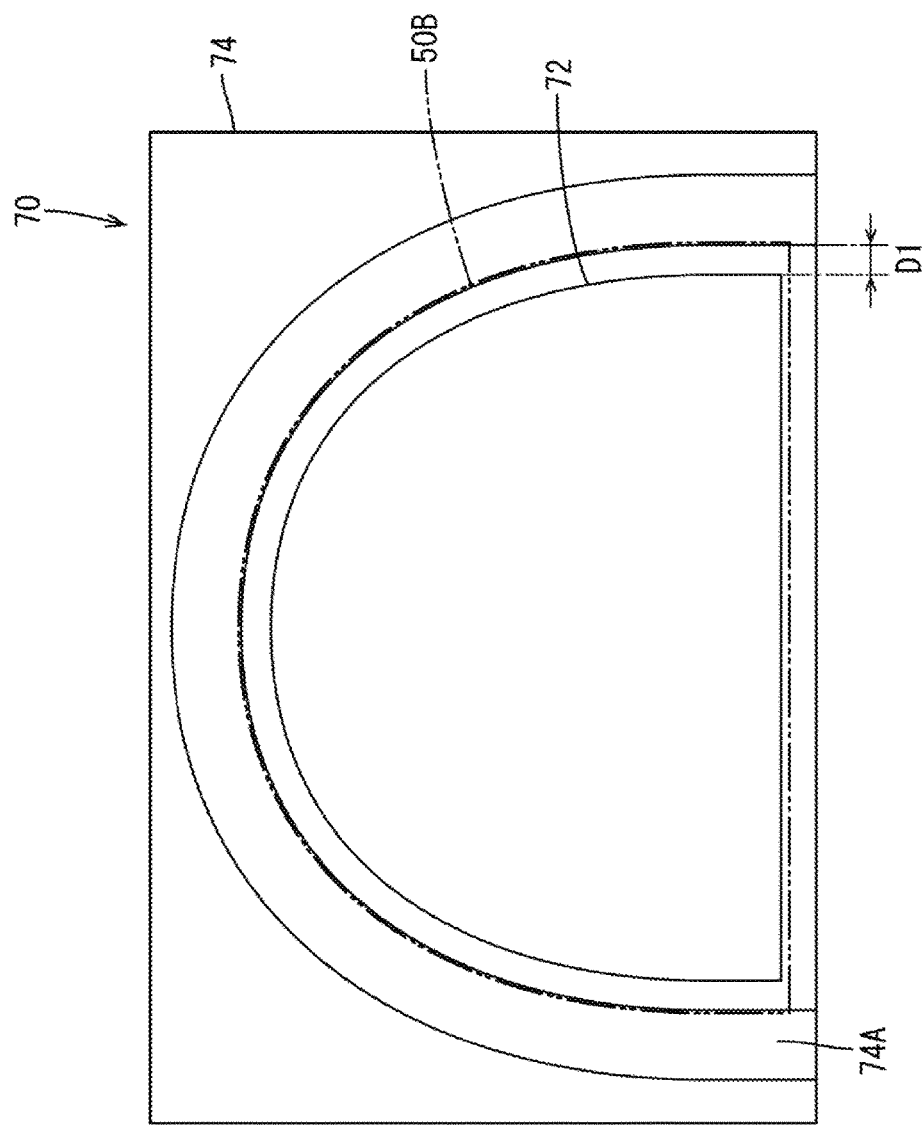
FIG. 8 is a plane view of a jig viewed downward.

Then, as illustrated in FIG. 8, a part of the end surface of the stacked substrate 50B is ground using a grinder 80, that is, a device that grinds a workpiece by rotating a cylindrical rotating grinding stone 82 to form the curved end surface of each liquid crystal panel 10 to be manufactured (a grinding process). In the grinding process, first, in each of the diced bonded substrates 50A constituting the stacked substrate 50B, a pair of glass substrates 20A and 30A and a pair of dummy substrates 62 positioned outside the thin film patterns are collectively ground along the outer shape of the curved end surface of each liquid crystal panel 10 to be manufactured. On the other hand, the linear end surface of the liquid crystal panel 10 to be manufactured is not ground. In FIGS. 6 and 7, an alternate long and short dash line indicates the contour line forming the outer shape of the curved end surface of the stacked substrate 50B which has undergone the grinding process. Hereinafter, the stacked substrate 50B which has undergone the grinding process is referred to as a ground stacked substrate 50C (see FIG. 9).

Here, the upper plate 72 and the lower plate 74 of the jig 70 will be described in detail. As illustrated in FIGS. 7 and 8, the upper plate 72 of the jig 70 has a plate surface having a substantially semicircular shape having a size slightly smaller than the area surrounded by the contour line indicated by the alternate long and short dash line and is pressed against the upper surface of the dummy substrate 62 at a position included in the area such that a distance D1 from the contour line is constant. The distance D1 between the contour line and the upper plate 72 in a state in which the upper plate 72 of the jig 70 is pressed against the upper surface of the dummy substrate 62 varies depending on the size of the plate surface of the upper plate 72 and is adjusted, for example, to 0.2 mm to 10 mm in accordance with a height of the stacked substrate 50B, that is, the number of stacked diced bonded substrates 50A. If this distance D is small, it takes time to align the jig 70 to accommodate the upper plate 72 in the area surrounded by the contour line when the stacked substrate 50B is pinched by the jig 70, and if the distance D is large, force of holding the stacked substrate 50B by the jig 70 is decreased.

On the other hand, the lower plate 74 of the jig 70 has a rectangular shape as illustrated in FIGS. 7 and 8, and the size of the plate surface thereof is substantially equal to the size of the plate surface of the dummy substrate 62. A curved (substantially semicircular) groove portion 74A is formed along the contour line in a portion of the upper surface of the lower plate 74 of the jig 70 corresponding to the portion located outside the contour line. Each of both ends of the curved groove portion 74A are opened on a side serving as the linear end surface of each liquid crystal panel 10 to be manufactured. A groove width of the groove portion 74A is larger than an outer diameter of the rotating grinding stone 82 of the grinder 80, and it is possible to cause a lower end portion of the rotating grinding stone 82 to be inserted into the groove portion 74A.

Since the upper plate 72 of the jig 70 have the above-described configuration, when the stacked substrate 50B is ground in the grinding process, the rotating grinding stone 82 of the grinder 80 does not interfere with the upper plate 72 of the jig 70. Therefore, it is possible to perform satisfactory grinding on the upper portion of the stacked substrate 50B without applying a load to the jig 70. Further, since the upper plate 72 of the jig 70 has the above-described configuration, when the stacked substrate 50B is ground in the grinding process, grinding is performed while causing the lower end portion of the rotating grinding stone 82 of the grinder 80 to be inserted into the groove portion 74A, and thus the rotating grinding stone 82 can perform the grinding up to the lower end portion of the stacked substrate 50B without interfering with the lower plate 74 of the jig 70. Therefore, it is possible to perform satisfactory grinding also on the lower portion of the stacked substrate 50B without applying a load to the jig 70.

Figure 9:
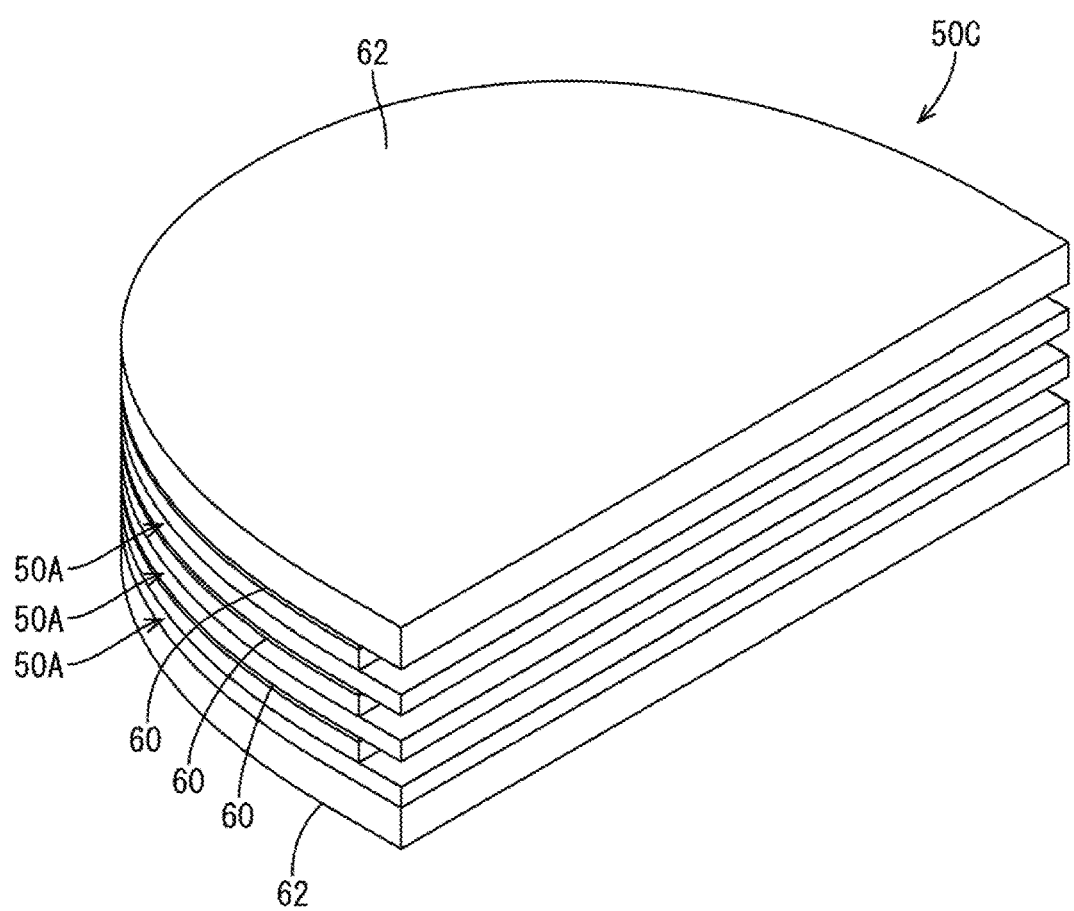
FIG. 9 is a perspective view illustrating a ground stacked substrate.
Figure 10:
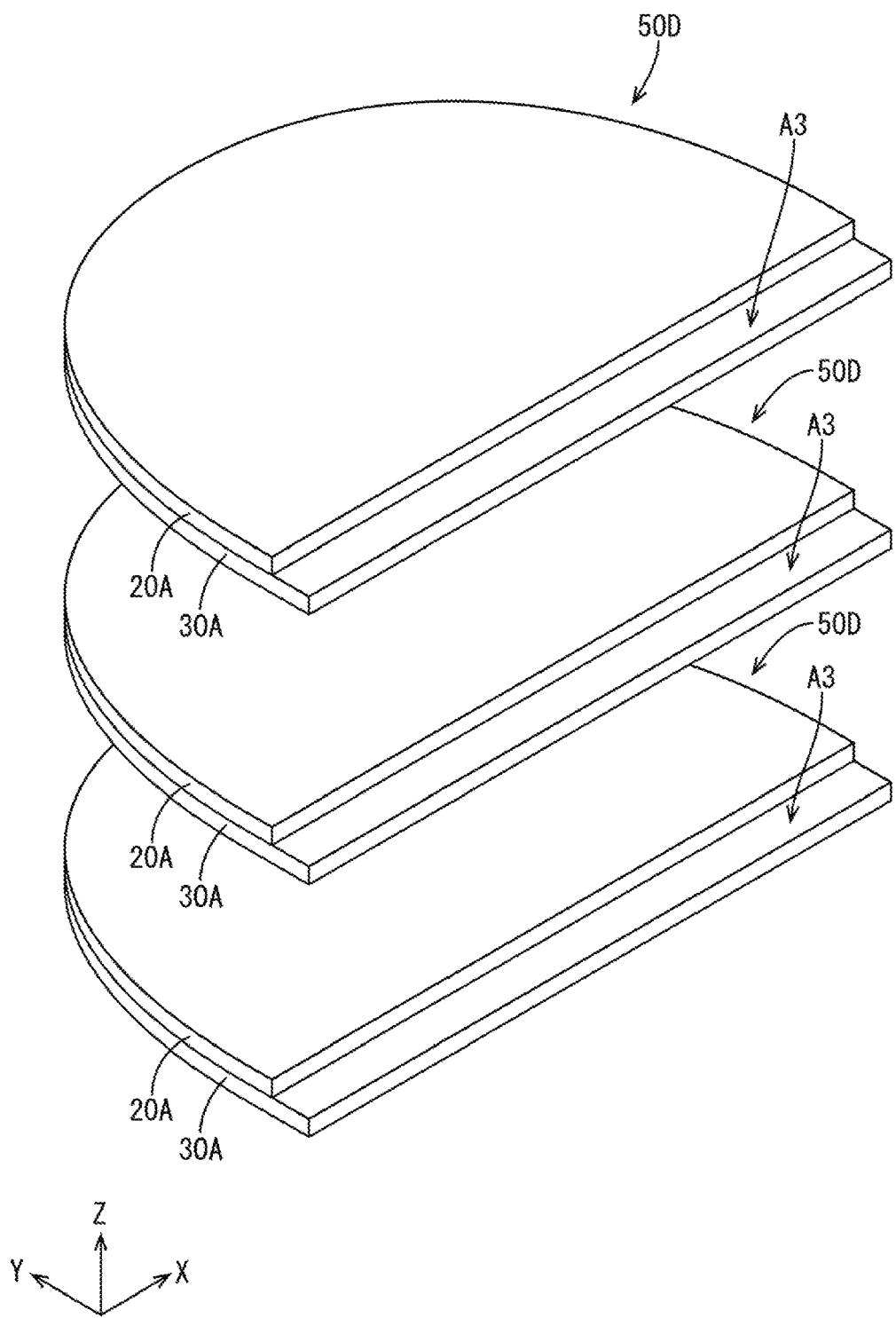
FIG. 10 is a perspective view illustrating each diced bonded substrate peeled off from a ground stacked substrate.

Here, the grinding process is carried out on the curved end surface along the outer shape of the liquid crystal panel 10 to be manufactured such that the contour line of the processed end surface which has undergone the grinding process at a planar view is curved, but since the curved end surface is processed by the grinding performed by the grinder 80, the occurrence of an unintended crack in the vicinity of the curved end surface is suppressed, for example, as compared with a case in which the curved end surface is processed by the scribing. Therefore, when the above grinding process is performed, it is possible to form a ground stacked substrate 50C in which the curved end surface is processed with satisfactory shape accuracy as illustrated in FIG. 9.

Then, the diced bonded substrates 50A and a pair of dummy substrates 62 constituting the ground stacked substrate 50C are peeled off (a peeling process) while removing grinding dust by cleaning the ground stacked substrate 50C. Since the ground stacked substrate 50C is cleaned in the peeling process, the sheet member 60 interposed between the diced bonded substrates 50A absorbs water or moisture and expands. Therefore, in the peeling process, each diced bonded substrate 50A and a pair of dummy substrates 62 can be easily peeled off from the sheet member 60. Thereafter, the polarizing plates 10C and 10D are attached to the outer surfaces of both glass substrates 20A and 30A of each ground diced bonded substrate 50A peeled off from the sheet member 60 (the ground bonded substrate 50D, see FIG. 10), and thus the three liquid crystal panels 10 according to the present invention are completed.

As described above, in the method of producing the liquid crystal panel 10 of the present embodiment, in the stacking process, the stacked substrate 50B is pinched in the stacking direction using the jig, and thus the stacked substrate 50B can be easily held in the stacked state. In the grinding process, the portion of the stacked substrate 50B located outside the CF layer 20L and the TFT layer 30L can be collectively ground along the outer shape of the liquid crystal panel 10 to be manufactured, and the curved end surfaces can be collectively formed. Therefore, the production process of the liquid crystal panel 10 can be reduced as compared with a case in which the bonded substrate is processed one by one to form the end surface of the display panel.

Further, since the diced bonded substrates 50A are held in the stacked state in the stacked substrate 50B, stiffness becomes larger than that of one diced bonded substrate 50A, and thus when a plurality of stacked diced bonded substrates 50A are collectively ground, the occurrence of a crack or the like on the end surface of the liquid crystal panel 10 to be manufactured can be suppressed. Further, since the curved end surface is formed by grinding the stacked diced bonded substrates 50A collectively, the contour line forming the outer shape of each liquid crystal panel 10 to be manufactured can be formed with satisfactory shape accuracy. As described above, according to the method of producing the liquid crystal panel 10 of the present embodiment, it is possible to collectively manufacture a plurality of liquid crystal panels 10 in which the outer shape has the curved portion with satisfactory shape accuracy while reducing the production process.

In the method of producing the liquid crystal panel 10 of the present embodiment, in the stacking process, since the sheet member 60 having a buffering property is interposed between the respective diced bonded substrates 50A, it is possible to suppress mutual interference of the stacked diced bonded substrates 50A and damages by the sheet member 60. Further, since the sheet member 60 has a water swelling property, as the ground stacked substrate 50C is cleaned in the peeling process, the sheet member 60 absorbs moisture and expands, and thus when the sheet member 60 is peeled off from each diced bonded substrate 50A after the grinding process, the sheet member 60 can be easily peeled off.

Further, in the method of producing the liquid crystal panel 10 of the present embodiment, in the stacking process, a pair of dummy substrates 62 having the plate surface larger than each diced bonded substrate 50A is prepared, and the stacked substrate 50B is pinched by the jig 70 with the dummy substrate 62 interposed therebetween. As described above, in the grinding process, in a state in which the stacked substrate 50B is held by the jig, the rotating grinding stone 82 or the like of the grinder 80 used for grinding comes into contact with the pair of dummy substrates 62 pinching the respective diced bonded substrates 50A. Therefore, in the grinding process, it is possible to suppress concentration of the stress accompanying the grinding on the diced bonded substrate 50A positioned at the uppermost side and the diced bonded substrate 50A positioned at the lowermost side among the stacked substrates 50B, and it is possible to suppress chipping or the like in both the diced bonded substrates 50A.

Further, in the stacking process, for example, in a case in which each bonded substrate is fixed by causing the curable resin to be interposed between the stacked bonded substrates, it takes time and effort to cause curable resin to be cured, and it takes time and effort to cause each bonded substrate to be peeled off from the curable resin after the grinding process. On the contrary, in the method of producing the liquid crystal panel 10 of the present embodiment, since the stacked substrate 50B is pinched and held by the jig 70 without using the curable resin, it is possible to easily hold the stacked substrate 50B, and it is possible to cause each ground diced bonded substrate 50A to be easily peeled off from the ground stacked substrate 50C after the grinding process. Therefore, it is possible to drastically reduce the production process of the liquid crystal panel 10 as compared with a case in which the stacked diced bonded substrates are held using the curable resin or the like.

Second Embodiment

A second embodiment will be described with reference to FIGS. 11 to 14. The method of producing display panels in this embodiment is different from that of the first embodiment in a mode of dividing a bonded substrate 150. Since the remaining parts of the method are similar to those in the first embodiment, description of the same parts as in the first embodiment is omitted.

Figure 11:
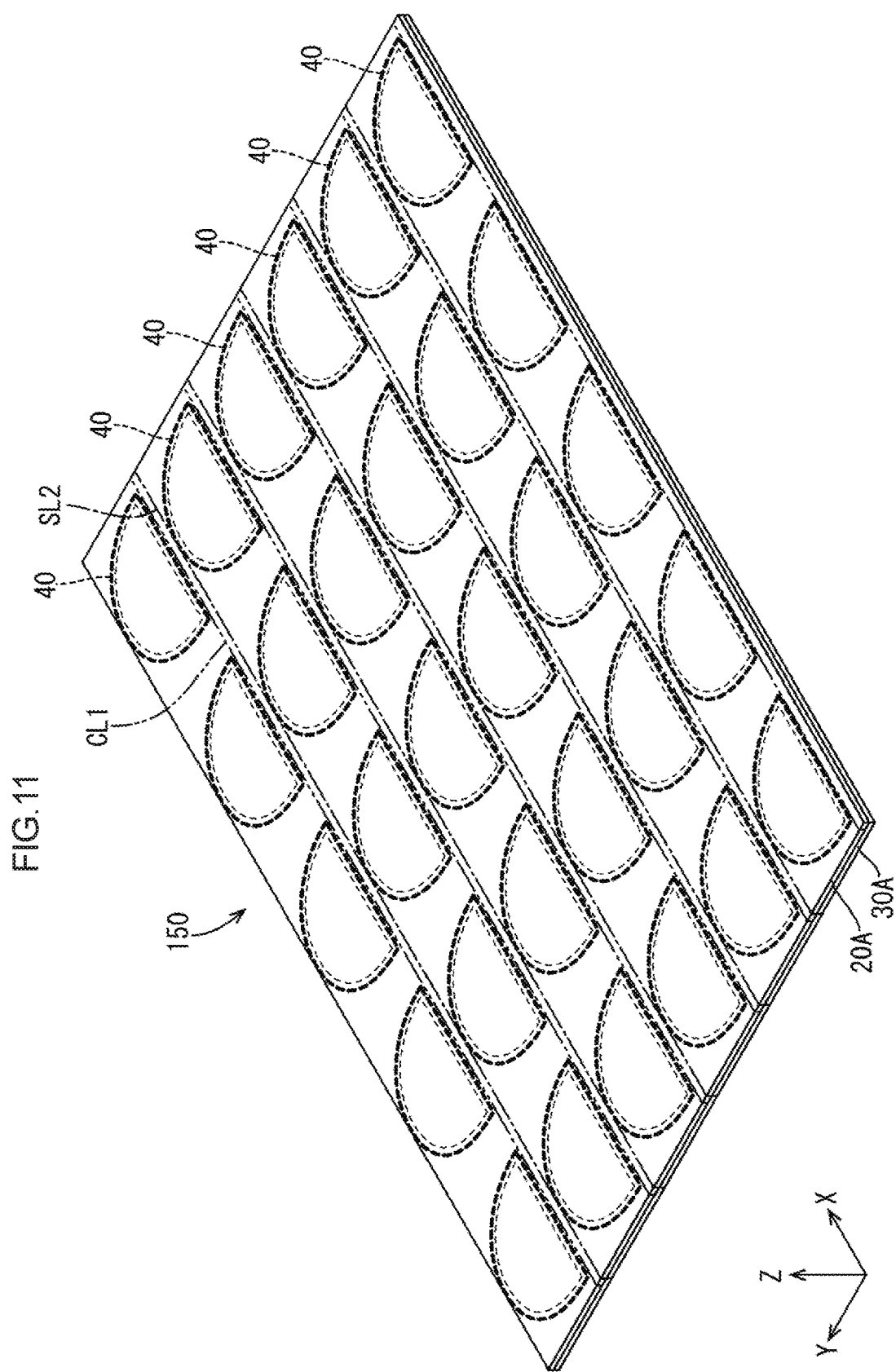
FIG. 11 is a perspective view illustrating a bonded substrate before divided in a second embodiment.
Figure 12:
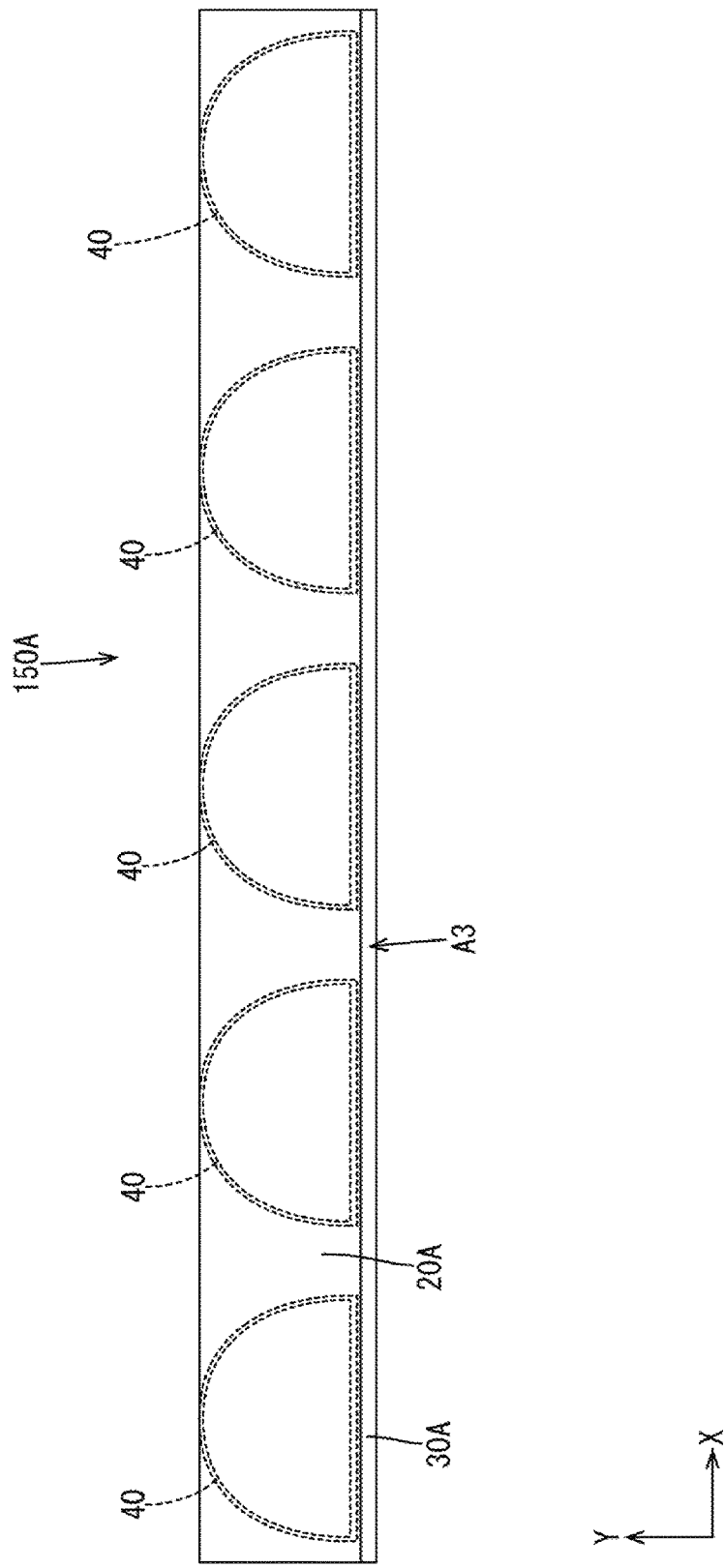
FIG. 12 is a plane view of a strip-like bonded substrate.

In the method of the present embodiment, in a bonding process, similarly to the first embodiment, liquid crystals are dropped into each area surrounded by a sealant 40 on a second glass substrate 30A on which the sealant 40 is formed by a one drop fill (ODF) technique using a liquid crystal dropping apparatus, and glass substrates 20A and 30A are bonded to each other to thereby form a bonded substrate 150 as illustrated in FIG. 11. With this bonding, the liquid crystals are spread between the glass substrates 20A and 30A, the inside of the area surrounded by the sealant 40 is filled with the liquid crystals, and the liquid crystal layer is formed between both the glass substrates 20A and 30A. After the bonding process, as illustrated in FIG. 12, the bonded substrate 150 is divided into a plurality of pieces so that each piece has a strip shape in which five panel areas are arranged linearly (five thin film patterns are arranged linearly) (a strip-like dicing process). Hereinafter, the bonded substrate 150 which is diced to have the strip shape after the strip-like dicing process is referred to as a "strip-like bonded substrate 150A." Specifically, in the strip-like dicing process, the bonded substrate 150 is scribed and divided using a scribe wheel (not illustrated) using lines of partitioning the bonded substrate 150 illustrated in FIG. 11 into six in the Y-axis direction (alternate long and short dash lines in the X-axis direction illustrated in FIG. 11) as scribe lines SL2, so that the bonded substrate 150 is divided into six strip-like bonded substrates 150A illustrated in FIG. 12.

Figure 13:
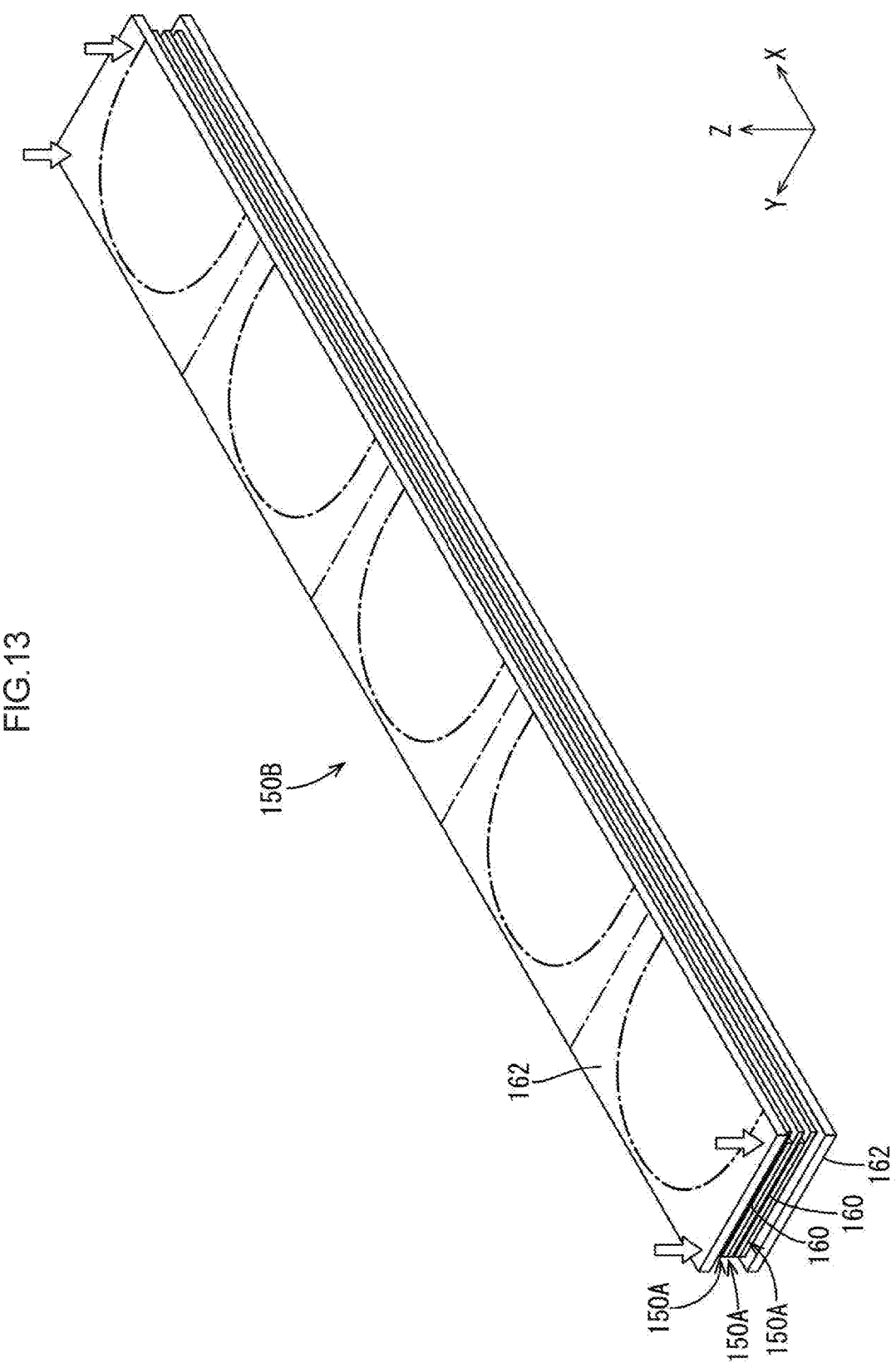
FIG. 13 is a perspective view illustrating a stacked substrate on which a strip-like bonding substrate is stacked.

Then, a stacking process of stacking the strip-like bonded substrates 150A is performed. In other words, as illustrated in FIG. 13, three strip-like bonded substrates 150A are stacked while dropping temporary fixing resin onto the four corners of each of the strip-like bonded substrates 150A with a sheet member 160 interposed therebetween whose size coincides with the size of the strip-like bonded substrate 150A, and the stacked strip-like bonded substrates 150A are pinched between a pair of dummy substrates 162 having the same size. Thereafter, positions corresponding to the four positions in which the temporary fixing resin is dropped (four positions indicated by arrows in FIG. 13) are spot-irradiated with ultraviolet light, so that the temporary fixing resin is cured, and the three strip-like bonded substrates 150A and a pair of dummy substrates 162 are thus fixed in the stacked state. Hereinafter, the stacked three strip-like bonded substrates 150A and a pair of dummy substrates 162 pinching the stacked three strip-like bonded substrates 150A are collectively referred to as a stacked substrate 150B.

Figure 14:
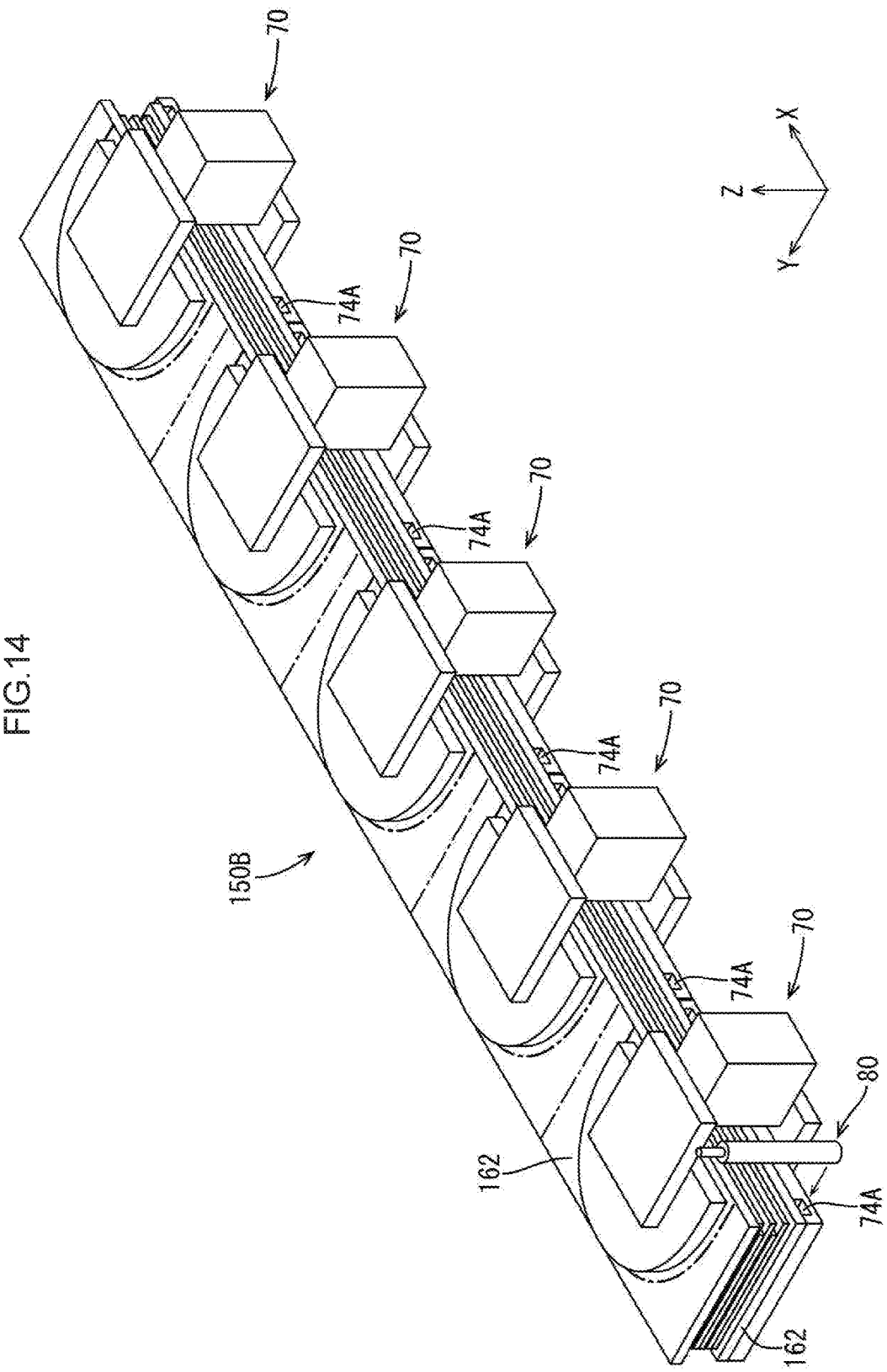
FIG. 14 is a perspective view illustrating a stacked substrate pinched in a jig for each panel area.

In the stacking process of the present embodiment, after the temporary fixing is performed, as illustrated in FIG. 14, the stacked substrate 150B is pinched by jigs 70 in the stacking direction for each panel area. Therefore, in the present embodiment, the stacked substrate 150B is pinched with five jigs 70. Thereby, the stacked substrate 150B is held for each panel area. A configuration of each jig 70 and a mode of pinching the stacked substrate 150B are similar to those in the first embodiment. In the grinding process performed after the stacking process, grinding is performed for each panel area using a grinder 80, and at the same time as when the grinding process is performed, the stacked substrate 150B is divided and diced into a plurality of pieces for each panel area (a dicing process). Accordingly, five ground stacked substrates are formed from one stacked substrate 150B. Thereafter, a peeling process and attachment of a polarizing plate are performed on each ground stacked substrate similarly to the first embodiment, and thus three liquid crystal panels 10 are completed from each ground stacked substrate.

As described above, in the method of producing the liquid crystal panel 10 of the present embodiment, in the bonding process, it is possible to form a liquid crystal layer between a pair of glass substrates 20A and 30A by applying the sealant 40 on the second glass substrate 30A which is one of a pair of glass substrates 20A and 30A in a form of surrounding each thin film pattern and bonding a pair of glass substrates 20A and 30A with the sealant 40 interposed therebetween in a state in which the liquid crystals serving as the liquid crystal layer are dropped. In the strip-like dicing process, it is possible to collectively form the end surfaces of a plurality of liquid crystal panels 10 having the curved contour line by collectively grinding a pair of substrates positioned outside the thin film patterns among a plurality of diced strip-like bonded substrates 150A along the outer shape of the liquid crystal panel 10 to be manufactured in the grinding process after the bonded substrate 150 is diced into a plurality of strips in which a plurality of thin film patterns are arranged linearly. Since the liquid crystal layer is formed by the ODF technique in the bonding process as described above, the production process of the liquid crystal panel 10 including the liquid crystal layer is reduced as compared with a case in which a vacuum injection technique is used. The production method of the present embodiment is particularly effective for liquid crystal panels 10 having sizes less than 10 inch.

Modified Example of Second Embodiment

Figure 15:
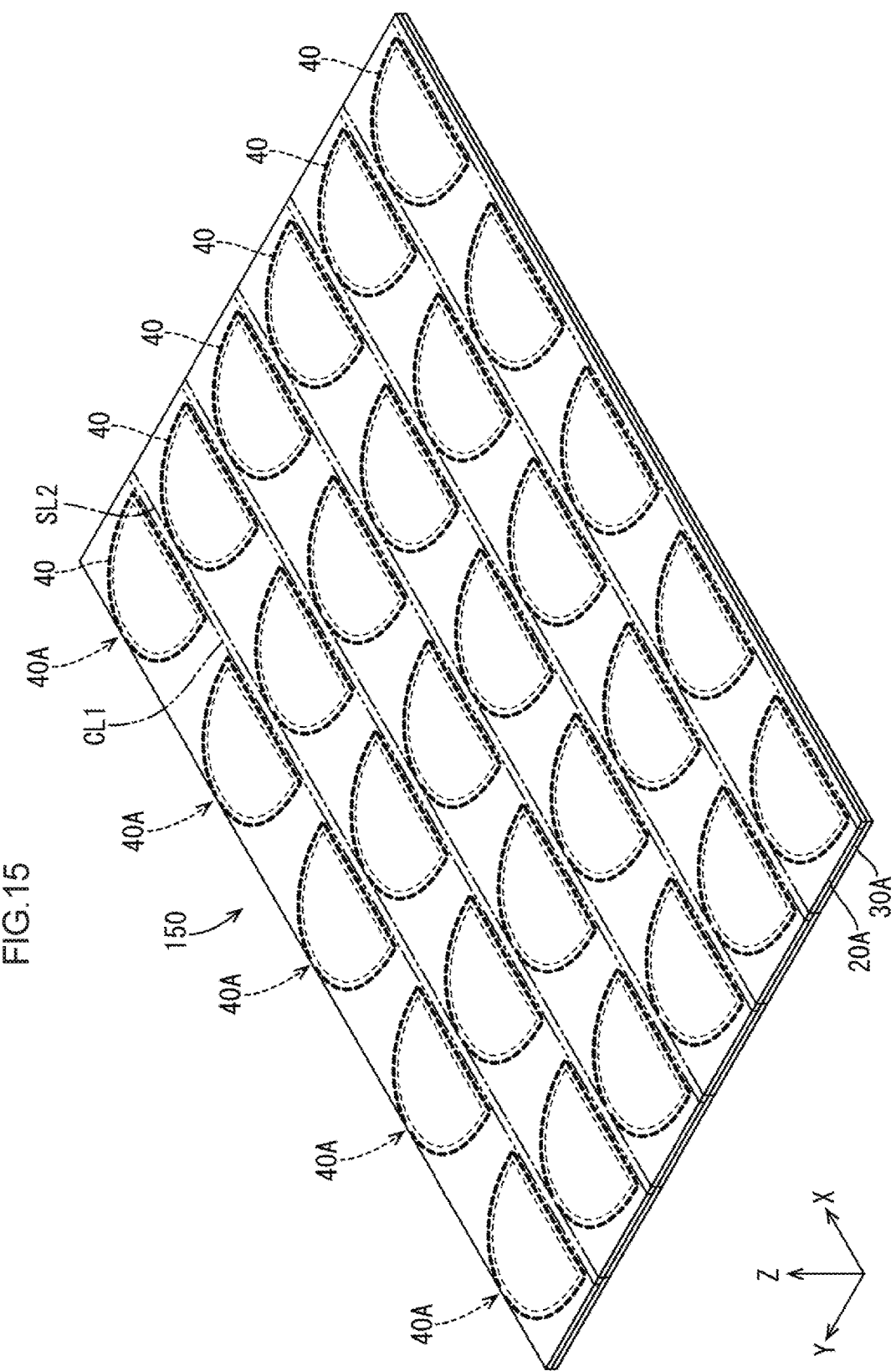
FIG. 15 is a perspective view illustrating a bonded substrate before divided in a modified example of the second embodiment.

A modified example of the second embodiment will be described with reference to FIGS. 15 and 16. In a production method of the present modified example, a mode of applying a sealant 40 and a mode of forming a liquid crystal layer are different from those of the second embodiment. In the production method of this modified example, when the sealant 40 is applied on a second glass substrate 30A with a predetermined width along the outer shape of each liquid crystal panel 10 to be manufactured (a substantially semi-circular shape in the present embodiment) in the bonding process, the sealant 40 is applied such that a middle of an arc-like portion of a substantially semicircular applying area along the outer shape of the liquid crystal panel 10 to be manufactured is slightly divided as illustrated in FIG. 15 (reference numeral 40A in FIG. 15 indicates a divided portion of the sealant 40).

Figure 16:
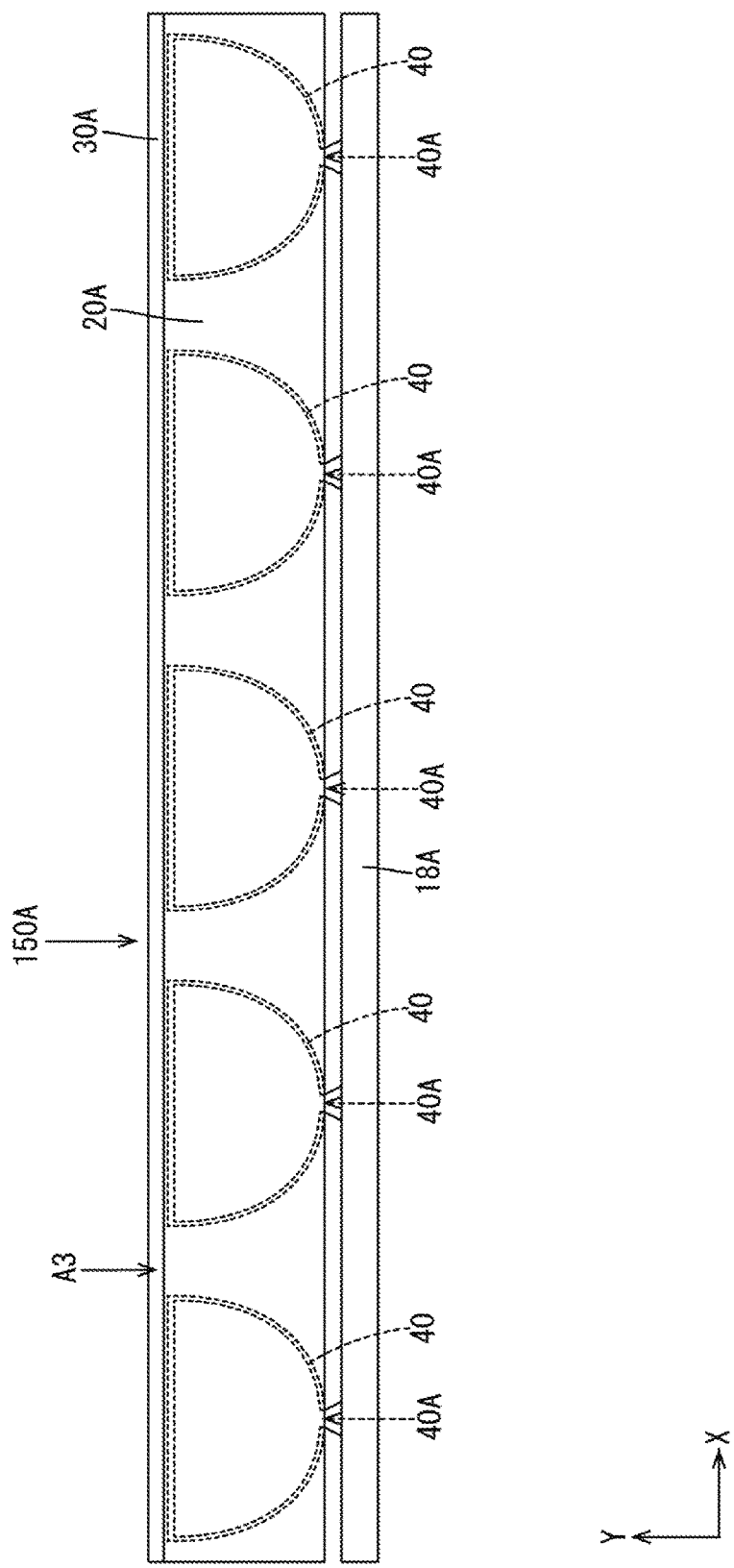
FIG. 16 is a plane view illustrating a liquid crystal injecting process.

Then, after the bonding process, a bonded substrate 150 undergoes a strip-like dicing process of dividing the bonded substrate 150 into a plurality of strip-like pieces so that five panel areas are arranged linearly, but at this time, each divided portion of the sealant 40 in each thin film pattern is exposed to the outside as illustrated in FIG. 16. Specifically, in the strip-like dicing process, for the strip-like bonded substrate 150A obtained by dicing the bonded substrate 150, the divided portion of the sealant 40 surrounding each of the five thin film patterns which are arranged linearly is used as an injection port 40A, and liquid crystals 18A constituting the liquid crystal layer 18 are collectively vacuum-injected from the injection port 40A to the inside of the sealant 40 (a liquid crystal injecting process). Thereafter, for the strip-like bonded substrate 150A, the injection port 40A of each sealant 40 is sealed with sealing resin 42 (a sealing process). Accordingly, the liquid crystals 18A injected from the injection port 40A are spread in the direction the plate surfaces of both glass substrates 20A and 30A, the inside of the area surrounded by the sealant 40 is filled with the liquid crystals 18A, and the liquid crystal layer 18 is formed between both the glass substrates 20A and 30A. In the sealing process, the sealing resin 42 is sealed such that the injection port 40A of each sealant 40 is drawn into the sealant 40. Thereafter, the liquid crystal panel 10 is completed by performing a stacking process, a grinding process, a peeling process, and attachment of the polarizing plate, similarly to the second embodiment described above.

As described above, in the method of producing the liquid crystal panel 10 of the present embodiment, in the bonding process, both the glass substrates 20A and 30A are bonded together with the sealant 40 interposed therebetween which is applied in the form in which a part of the sealant 40 is divided, and in the strip-like dicing process, the bonded substrate 150 is diced into a plurality of strips in which a plurality of thin film patterns are linearly arranged to form the strip-like bonded substrate 150A, and in the liquid crystal injecting process, the liquid crystals 18A can be collectively injected into the inside of each sealant 40 surrounding each thin film pattern. In the subsequent grinding process, the curved end surfaces can be collectively formed by collectively grinding the portions of the strip-like bonded substrates 150A located outside the thin film patterns along the outer shape of the liquid crystal panel 10 to be manufactured. Therefore, the production process of the liquid crystal panel 10 having the liquid crystal layer 18 can be reduced as compared with a case in which, for each sealant 40 applied on the bonded substrate 150, the liquid crystals 18A are injected inside the sealant 40 for each sealant 40, and the bonded substrate 150 is processed one by one for each panel area to form the end surface of the liquid crystal panel 10. The production method of the present embodiment is particularly effective for liquid crystal panels 10 having sizes less than 10 inch.

Third Embodiment

A second embodiment will be described with reference to FIGS. 17 to 19. The present embodiment differs from the first embodiment in an outer shape of a liquid crystal panel 210 to be manufactured, a configuration of a jig 270 used in a stacking process in a production process, and a pinching mode of the jig 270. Since the remaining parts of the production method are similar to those in the first embodiment, description of the same parts as in the first embodiment is omitted. In the liquid crystal panel 210 described in the present embodiment, the outer shape is a substantially circular shape at a planar view, and the entire contour line forming the outer shape is curved as illustrated in FIG. 17. Therefore, a part of the contour line forming the outer shape corresponding to a mounting area A3 is curved. In FIG. 17, portions in which number 200 is added to reference numerals in FIG. 1 are the same as ones described in the first embodiment, and alternate long and short dash lines in FIGS. 17 to 19 indicate substantially circular contour lines forming the outer shape of the stacked substrate 50B which has undergone the grinding process.

Next, a configuration of the jig 270 used in the stacking process in the production process of the liquid crystal panel 210 having the outer shape as described above will be described. The jig 270 described in the present embodiment differs from that of the first embodiment in configurations of an upper plate 272 and a lower plate 274. As illustrated in FIG. 18, the upper plate 272 of the jig 270 has a plate surface having a substantially circular shape having a size slightly smaller than the area surrounded by the contour line indicated by the alternate long and short dash line, is aligned to fall within the area, and is pressed against the upper surface of the dummy substrate 62. When the alignment of the upper plate 272 is performed, the distance between the contour line and the upper plate 272 is adjusted to be substantially constant.

Figure 18:
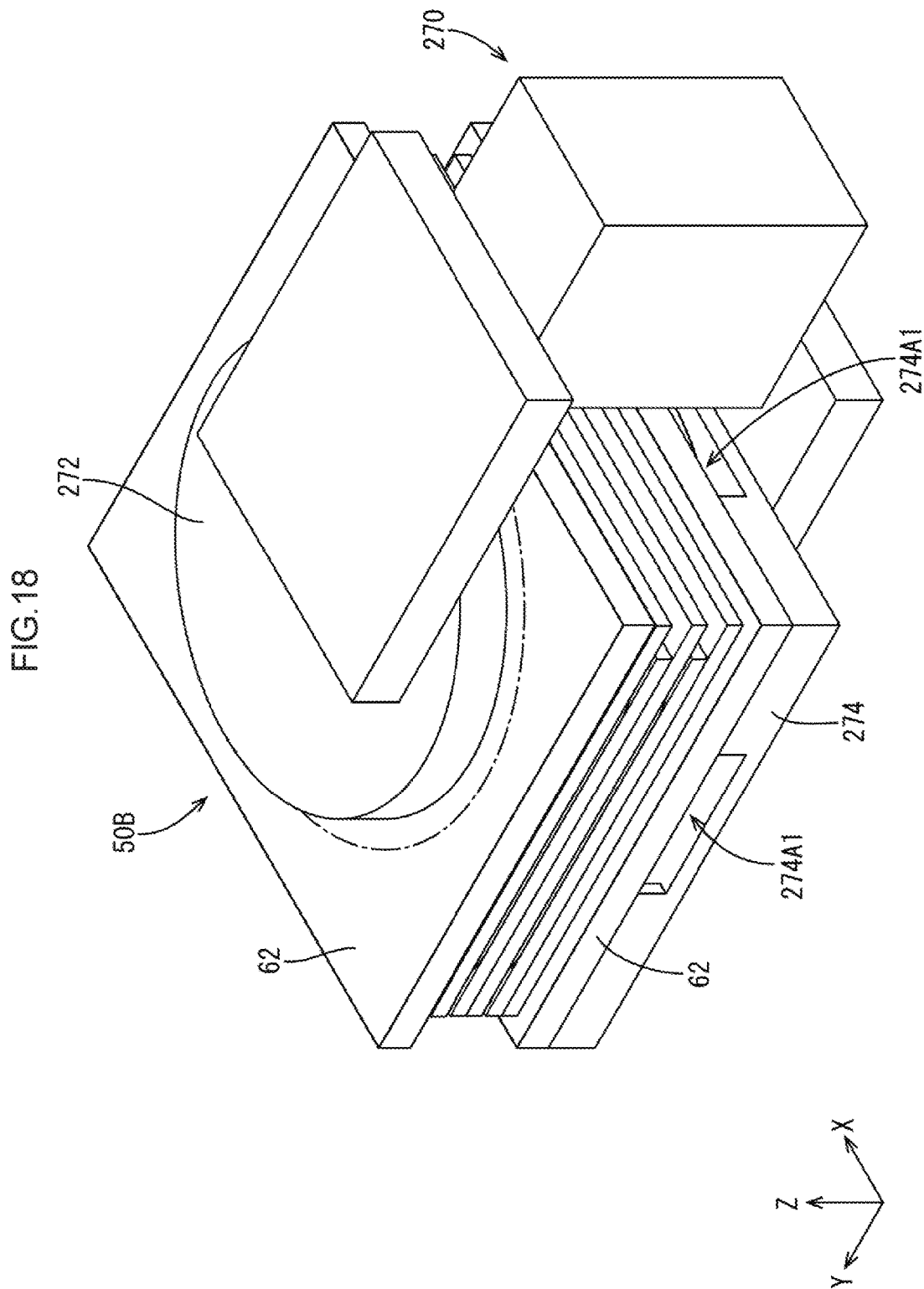
FIG. 18 is a perspective view illustrating a grinding procedure (1) in a grinding process.
Figure 19:
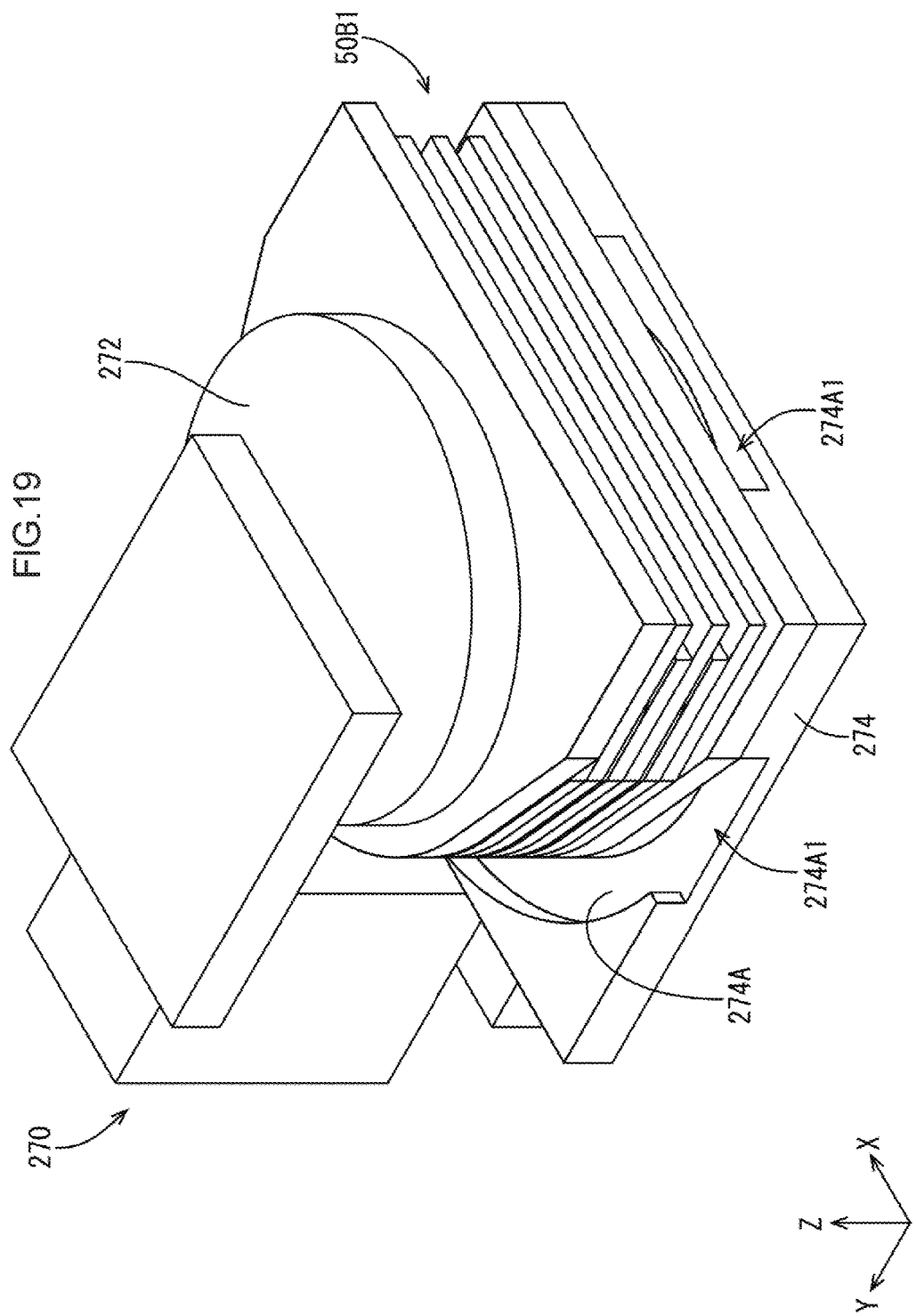
FIG. 19 is a perspective view illustrating a grinding procedure (2) in a grinding process.

On the other hand, as illustrated in FIG. 18, the lower plate 274 of the jig 270 has a rectangular shape, similarly to the first embodiment, and the size of the plate surface thereof is substantially equal to the size of the plate surface of a dummy substrate 62. A curved (substantially circular) groove portion 274A is formed along the contour line in a portion of the upper surface of the lower plate 74 of the jig 70 corresponding to the portion located outside the contour line. The curved groove portion 274A communicates with four groove opening portions 274A1 having a groove shape formed in four sides of the lower plate 274 in an opened form. Groove widths of the groove portion 274A and the groove opening portion 274A1 are larger than the outer diameter of the rotating grinding stone 82 of the grinder 80, and thus the lower end portion of the rotating grinding stone 82 can be inserted into the groove portion 274A from each groove opening portion 274A1.

In the grinding process of grinding a stacked substrate 50B pinched between the jig 270 having the above-described configuration, first, the side of the stacked substrate 50B opposite to the side on which the support portion of the jig 270 is arranged (a diagonally upper left side in FIG. 18) is ground along the contour line having a substantially circular shape by a length of half of the contour line (a substantially semicircular line segment). Accordingly, a part of the portion of the stacked substrate 50B located outside the contour line is ground. Then, the jig 270 is temporarily removed from the stacked substrate 50B, and the position of the jig 270 is changed. Specifically, after a direction of the jig 270 is changed by 180°, and the position of the jig 270 is aligned again, the support portion of the jig 270 is arranged on the already ground side of the stacked substrate 50B (the diagonally upper left side in FIG. 19) as illustrated in FIG. 19.

Then, the side opposite to the side on which the support portion of the jig 270 is arranged (a diagonally lower right side in FIG. 19) is ground along the contour line having a substantially circular shape by a length of half of the contour line (a substantially semicircular line segment). Accordingly, the remaining portion of the stacked substrate 50B located outside the contour line is ground. With the above procedure, the substantially circular outer shape of the liquid crystal panel 210 to be manufactured can be formed. Further, when the stacked substrate 50B is ground in the grinding process, grinding is performed while causing the lower end portion of the rotating grinding stone of the grinder to be inserted into the groove portion 274A from the groove opening portion 274A1, and thus the rotating grinding stone 82 can perform the satisfactory grinding up to the lower end portion of the stacked substrate 50B without interfering with the lower plate 274 of the jig 270.

As described above, in the method of producing the liquid crystal panel 210 of the present embodiment, the liquid crystal panel 210 is manufactured through the above-described procedure using the jig 270, and thus the liquid crystal panel 210 having the circular outer shape can be formed with satisfactory shape accuracy. In other words, after the semicircular contour line which is half of the outer shape of the liquid crystal panel 210 to be manufactured is formed by grinding a part of the stacked substrate 50B, the position of the jig 270 is changed, the position of the support portion is changed, and then the stacked substrate 50B can be ground again, and thus the circular liquid crystal panel 210 can be manufactured by further forming the semicircular contour line which is the remaining half of the outer shape of the liquid crystal panel 210 to be manufactured.

Modified Example of Third Embodiment

Figure 20:
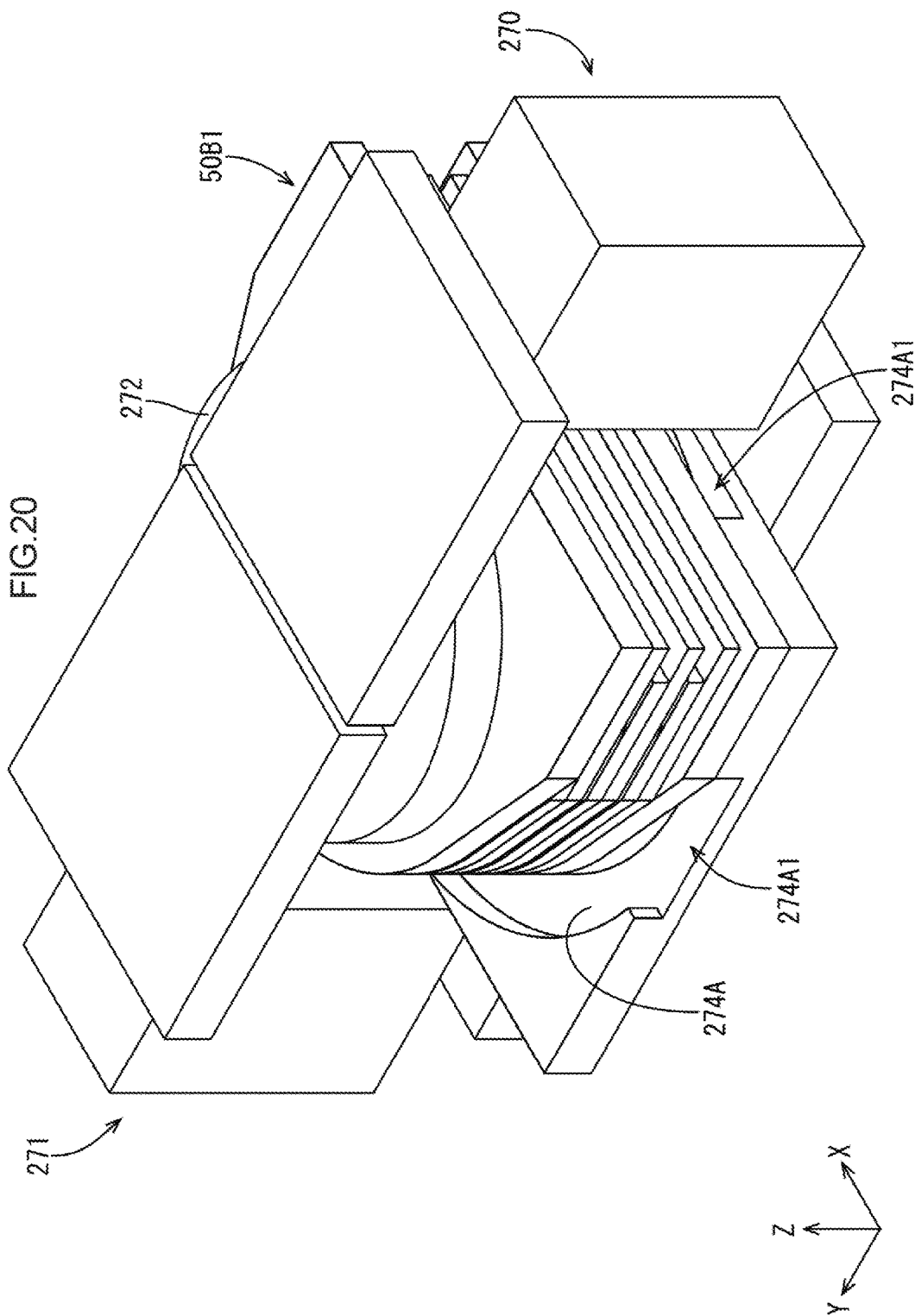
FIG. 20 is a perspective view illustrating a grinding procedure in a grinding process in a modified example of a third embodiment.

Then, a modified example of the third embodiment will be described with reference to FIG. 20. The present modified example differs from the third embodiment in a method of changing the position of the jig 270 in the grinding process. A method of producing the liquid crystal panel, a configuration of the liquid crystal panel to be manufactured, and a configuration of the jig 270 are similar to those of the first embodiment and the third embodiment, and thus description thereof is omitted. In a stacking process in the method of producing a liquid crystal panel of the present modified example, when the position of the jig 270 is changed after a part of the stacked substrate 50B is ground, instead of detaching the original jig 270 from the stacked substrate 50B and changing the position of the jig 270, the original jig 270 is detached from the stacked substrate 50B after the stacked substrate 50B is further pinched by another jig 271. In other words, while maintaining the state in which the stacked substrate 50B is pinched by the upper plate 272 and the lower plate 274 of the original jig 270, another jig 271 including a support portion, an upper connecting portion, and a lower connecting portion is connected to the upper plate 272 and the lower plate 274 from the side opposite to the side in which the support portion of the original jig 270 is arranged as illustrated in FIG. 20.

Then, the upper connecting portion and the lower connecting portion of the original jig 270 are detached from the upper plate 272 and the lower plate 274, respectively. Accordingly, the positions of the jigs 270 and 271 can be exchanged 180° while maintaining the state in which the stacked substrate 50B is pinched by the upper plate 272 and the lower plate 274. Thereafter, the substantially circular outer shape of the liquid crystal panel 210 to be manufactured can be formed by grinding the remaining portion of the stacked substrate 50B.

Here, in a stacking process, when a part of the stacked substrate 50B is ground, an alignment mark used for aligning the jig 270 may be ground. For this reason, if the entire jig 270 is changed in the middle of the grinding process as in the production method of the third embodiment, it is difficult to align the jig 270 again, and the stacked substrate 50B once stacked may have a stacking deviation. In this respect, in the present modified example, since the positions of the jigs 270 and 271 can be exchanged while maintaining the state in which the stacked substrate 50B is pinched as described above, the above-mentioned problem does not occur, and it is possible to simplify and reduce the grinding process as compared with a case in which the jig 270 is temporarily detached from the stacked substrate 50B, and the position of the jig 270 is changed in the grinding process.

Modified examples of the above-described embodiments are listed below.

(1) In each of the above-described embodiments, the jig including the upper plate, the lower plate, the upper connecting portion, the lower connecting portion, and the support portion has been described as an example, but a shape and a configuration of the jig are limited as long as the grinding process can be performed in the state in which the jig pinches and holds the stacked substrate in the stacking direction, and the stacked substrate is held.

(2) In each of the above-described embodiments, the photo-curable resin is used as the temporary fixing resin, but thermosetting resin may be used as the temporary fixing resin.

(3) In each of the above-described embodiments, the example in which the grinding process of the stacked substrate is performed using the grinder in the grinding process has been described, but a grinding method in the grinding process and a grinding equipment are not limited.

(4) In each of the above-described embodiments, the method of producing the liquid crystal panel constituting the liquid crystal display device has been described, but a type of display device including the display panel produced by the production method of the present invention is not limited. For example, the production method of the present invention may be applied to a process of producing an organic EL panel constituting an organic EL display device.

The embodiments of the present invention have been described above in detail, but the above embodiments are merely examples and do not limit the scope of claims set forth below. Technologies described in claims include various modifications and changes of the specific examples described above.

EXPLANATION OF SYMBOLS

10, 210: Liquid crystal panel
12: IC chip
14: Flexible substrate
18: Liquid crystal layer
18A: Liquid crystal
20: Color filter substrate
20A: First glass substrate
20L: CF layer
22: Color filter
24: Counter electrode
30: Array substrate
30A: Second glass substrate
30L: TFT layer
32: TFT
34: Pixel electrode
40: Sealant
40A: Injection port
50, 150: Bonded substrate
50A: Diced bonded substrate
50B, 150B: Stacked substrate
50C: Ground stacked substrate
60: Sheet member
62: Dummy substrate
70, 270, 271: Jig
72, 272: Upper plate
74, 274: Lower plate
74A, 274A: Groove portion
80: Grinder
82: Rotating grinding stone
150A: Strip-like bonded substrate
A1: Display area
A2: Non-display area
A3: Mounting area
CL1: Cut line
R1: Temporary fixing resin
SL1, SL2: Scribe line

The invention claimed is:

1. A method of collectively producing a plurality of display panels each including a contour line of an outer shape, at least a section of which is curved, the method comprising:
a bonding process of bonding a pair of substrates including a first substrate and a second substrate, the second substrate including a plurality of thin film patterns thereon, and forming a bonded substrate;
a stacking process of stacking a plurality of bonded substrates after the bonding process and pinching and holding stacked bonded substrates in a stacking direction using a jig that includes an upper plate and a lower plate; and
a grinding process of collectively forming end surfaces of the plurality of display panels forming the curved contour line by collectively grinding the pair of substrates located outside the thin film pattern among the stacked bonded substrates along the outer shape in a state in which the stacked bonded substrates are pinched by the jig after the stacking process, wherein
in the stacking process, a pair of dummy substrates having a plate surface larger than the bonded substrate are prepared, and the stacked bonded substrates are pinched by the upper plate and the lower plate of the jig with each of the dummy substrates interposed between the stacked bonded substrates and each of the upper plate and the lower plate.

2. The method of producing display panels according to claim 1, wherein a buffer member is interposed between two of the plurality of bonded substrates in the stacking process.

3. The method of producing display panels according to claim 2, wherein the buffer member having a water swelling property is used in the stacking process.

4. The method of producing display panels according to claim 1, wherein
the jig further includes a first plate-shaped member having the curved contour line, a second plate-like member, and a connecting member connecting the first plate-shaped member with the second plate-shaped member, and
in the stacking process, in a state in which the connecting member is positioned outside the stacked bonded substrates, the first plate-shaped member is caused to overlap portions excluding portions to be ground in the grinding process in the stacked bonded substrates at a planar view, and the plurality of bonded substrates are pinched between the first plate-shaped member and the second plate-shaped member.

5. The method of producing display panels according to claim 4, wherein
a groove along the curved contour line is formed in one plate surface of the second plate-shaped member of the jig, and
in the stacking process, the plurality of bonded substrates are pinched between the first plate-shaped member and the second plate-shaped member such that the one plate surface of the second plate-shaped member faces inward.

6. The method of producing display panels according to claim 4, wherein
the first plate-shaped member of the jig has a circular shape, and
in the grinding process, after portions of the stacked bonded substrates are ground, a position of the jig is changed, and the stacked bonded substrates are ground again.

7. The method of producing display panels according to claim 4, wherein
the first plate-shaped member of the jig has a circular shape, and
in the grinding process, after portions of the stacked bonded substrates are ground, the first plate-shaped member is connected with the second plate-shaped member through a member different from the connecting member while holding the stacked bonded substrates with the jig, and after the connecting member is detached, the stacked bonded substrates are ground again.

8. The method of producing display panels according to claim 1, wherein
the display panel has a configuration in which a liquid crystal layer is formed on an inner surface side of the bonding substrate,
in the bonding process, the pair of substrates are bonded in a state in which a plurality of sealants are applied on one of the pair of substrates in a form of surrounding each of the thin film patterns, and liquid crystals serving as the liquid crystal layer are dropped,
the method of producing display panels further comprises a strip-shaped dicing process of dicing the bonded substrate into a plurality of strips in which the plurality of thin film patterns are arranged linearly by dividing the bonded substrate after the bonding process, and
in the stacking process, the plurality of bonded substrates diced in a form of the strip are pinched by the jig for each area including a single thin film pattern.

9. The method of producing display panels according to claim 1, wherein
the display panel has a configuration in which a liquid crystal layer is formed on an inner surface side of the bonding substrate,
in the bonding process, a plurality of sealants are applied on the one substrate in a form in which each of the thin film patterns is surrounded, and portions of the sealants are divided, and the pair of substrates are bonded with the sealant interposed therebetween,
the method of producing display panels further comprises:
a strip-shaped dicing process of dicing the bonded substrate into a plurality of strips in which the plurality of thin film patterns are arranged linearly by dividing the bonded substrate after the bonding process;
a liquid crystal injecting process of collectively injecting liquid crystals constituting the liquid crystal layer from an injection port into the inside of the sealant using the divided portions of the sealants surrounding the plurality of thin film patterns arranged linearly as the injection port; and
a sealing process of sealing the injection port of each of the sealants with sealing resin before the stacking process after the liquid crystal injecting process, and
in the stacking process, the plurality of bonded substrates diced in a form of the strip are pinched by the jig for each area including a single thin film pattern.

10. The method of producing display panels according to claim 1, wherein in the grinding process, in a state in which the stacked bonded substrates are held by the jig, a grinder comes into contact first with the pair of dummy substrates pinching the stacked bonded substrates.

11. A method of collectively producing a plurality of display panels each including a contour line of an outer shape, at least a section of which is curved, the method comprising:
a bonding process of bonding a pair of substrates including a first substrate and a second substrate, the second substrate including a plurality of thin film patterns thereon, and forming a bonded substrate;
a stacking process of stacking a plurality of bonded substrates after the bonding process and pinching and holding the plurality of stacked bonded substrates in a stacking direction using a jig that includes an upper plate and a lower plate; and
a grinding process of collectively forming end surfaces of the plurality of display panels forming the curved contour line by collectively grinding the pair of substrates located outside the thin film pattern among the stacked bonded substrates along the outer shape in a state in which the stacked bonded substrates are pinched by the jig after the stacking process, wherein
the display panel has a configuration in which a liquid crystal layer is formed on an inner surface side of the bonding substrate,
in the bonding process, the pair of substrates are bonded in a state in which a plurality of sealants are applied on one of the pair of substrates in a form of surrounding each of the thin film patterns, and liquid crystals serving as the liquid crystal layer are dropped,
the method of producing display panels further comprises a strip-shaped dicing process of dicing the bonded substrate into a plurality of strips in which the plurality of thin film patterns are arranged linearly by dividing the bonded substrate after the bonding process, and
in the stacking process, the plurality of bonded substrates diced in a form of the strip are pinched by the jig for each area including a single thin film pattern.

* * * * *